US007840007B2

(12) United States Patent
Takeda et al.

(10) Patent No.: US 7,840,007 B2
(45) Date of Patent: Nov. 23, 2010

(54) DIGITAL DATA FALSE ALTERATION DETECTION PROGRAM AND DIGITAL DATA FALSE ALTERATION DETECTION APPARATUS

(75) Inventors: Naoto Takeda, Kyoto (JP); Masamichi Taniguchi, Okayama (JP); Kunio Taniguchi, Okayama (JP); Kiyotaka Yamamoto, Kyoto (JP)

(73) Assignees: Fuso Precision Co., Ltd., Kyoto (JP); Naigai Process Co., Ltd., Okayama (JP)

( * ) Notice: Subject to any disclaimer, the term of this patent is extended or adjusted under 35 U.S.C. 154(b) by 1201 days.

(21) Appl. No.: 10/497,236

(22) PCT Filed: Dec. 3, 2002

(86) PCT No.: PCT/JP02/12626

§ 371 (c)(1),
(2), (4) Date: Mar. 9, 2005

(87) PCT Pub. No.: WO03/049422

PCT Pub. Date: Jun. 12, 2003

(65) Prior Publication Data

US 2005/0177737 A1      Aug. 11, 2005

(30) Foreign Application Priority Data

Dec. 3, 2001     (JP) .............................. 2001-368627

(51) Int. Cl.
*H04N 7/167*    (2006.01)
(52) U.S. Cl. ...................................... 380/210
(58) Field of Classification Search .................. 380/210
See application file for complete search history.

(56) References Cited

U.S. PATENT DOCUMENTS

| 6,233,364 | B1 * | 5/2001 | Krainiouk et al. ............ 382/275 |
| 6,289,108 | B1 * | 9/2001 | Rhoads ....................... 382/100 |
| 6,754,365 | B1 * | 6/2004 | Wen et al. .................... 382/100 |

FOREIGN PATENT DOCUMENTS

| EP | 1 126 408 A2 | 8/2001 |
| JP | 10-228558 | 8/1998 |
| JP | 2000-36069 | 2/2000 |
| JP | 2001-218023 | 8/2001 |
| JP | 2001-309149 | 11/2001 |
| WO | WO 91/20054 | 12/1991 |
| WO | WO 99/17537 | 4/1999 |
| WO | WO 99/52271 | 10/1999 |

OTHER PUBLICATIONS

Supplementary European Search Report for PCT/JP02/12626, Mar. 22, 2007, Fuso Precision Co., Ltd., et al.

* cited by examiner

*Primary Examiner*—Kambiz Zand
*Assistant Examiner*—Stephen Sanders
(74) *Attorney, Agent, or Firm*—Hodgson Russ LLP

(57) ABSTRACT

A digital data false alteration detection program causes a computer to execute (a) a step (S1) of dividing digital data into a plurality of smaller block data, (b) a step (S2) of extracting noise inherent to a digital data acquisition device for each of the small block data, (c) a step (S3) of calculating correlation of the noise between adjacent small block data, and (d) a step (S4) of detecting small block data having noise correlation lower than a level predetermined for the surrounding small block data, as falsely altered data.

35 Claims, 34 Drawing Sheets (A)

(B)

| B001 | B002 | B003 | B004 | B005 | B006 | B007 | B008 |
|------|------|------|------|------|------|------|------|
| B009 | B010 | B011 | B012 | B013 | B014 | B015 | B016 |
| B017 | B018 | B019 | B020 | B021 | B022 | B023 | B024 |
| B025 | B026 | B027 | B028 | B029 | B030 | B031 | B032 |
| B033 | B034 | B035 | B036 | B037 | B038 | B039 | B040 |

| 200 | 203 | 201 |
|---|---|---|
| 197 | 199 | 200 |
| 201 | 203 | 205 |

(B)

| 200 | 203 | 201 |
|---|---|---|
| 197 | 199 | 200 |
| 201 | 203 | 205 |

(C)

| 159 | 153 | 151 |
|---|---|---|
| 156 | 151 | 150 |
| 155 | 154 | 154 |

(D)

| 159 | 153 | 151 |
|---|---|---|
| 156 | 151 | 150 |
| 155 | 154 | 154 |

Fig. 29

| 100 | 101 | 200 | 102 | | 101 | | | 102 | 100 | | | |
|---|---|---|---|---|---|---|---|---|---|---|---|---|
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |

| R = 0 | G = 0 | R = 0 | G = 255 |
|---|---|---|---|
| G = 0 | B = 0 | G = 255 | B = 255 |
| R = 0 | G = 255 | R = 255 | G = 0 |
| G = 255 | B = 255 | G = 0 | B = 0 |

(B)

| 1 | 2 | 3 | 4 |
|---|---|---|---|
| 5 | 6 | 7 | 8 |
| 9 | 10 | 11 | 12 |
| 13 | 14 | 15 | 16 |

| R(0) G(0) B(0) | R(0) G(0) B(0) | R(0) G(170) B(128) | R(0) G(255) B(255) |
|---|---|---|---|
| R(0) G(0) B(0) | R(64) G(128) B(0) | R(128) G(0) B(128) | R(128) G(170) B(255) |
| R(0) G(170) B(128) | R(128) G(0) B(128) | R(0) G(128) B(128) | R(255) G(0) B(128) |
| R(0) G(255) B(255) | R(128) G(170) B(255) | R(255) G(0) B(128) | R(255) G(0) B(0) |

(B)

| R(8) G(27) B(21) | R(21) G(62) B(57) | R(33) G(123) B(128) | R(43) G(180) B(199) |
|---|---|---|---|
| R(21) G(62) B(56) | R(50) G(72) B(80) | R(81) G(95) B(128) | R(108) G(123) B(176) |
| R(33) G(123) B(128) | R(81) G(95) B(128) | R(129) G(72) B(128) | R(174) G(62) B(128) |
| R(44) G(180) B(199) | R(109) G(123) B(176) | R(175) G(62) B(128) | R(220) G(27) B(80) |

| R=8 | G=62 | R=33 | G=180 |
|---|---|---|---|
| G=62 | B=80 | G=95 | B=176 |
| R=33 | G=95 | R=175 | G=27 |
| G=180 | B=176 | G=62 | B=80 |

(B)

| R(8) G(62) B(80) | R(25) G(62) B(80) | R(33) G(112) B(128) | R(105) G(180) B(176) |
|---|---|---|---|
| R(25) G(62) B(80) | R(64) G(128) B(80) | R(104) G(95) B(128) | R(104) G(101) B(176) |
| R(33) G(112) B(128) | R(104) G(95) B(128) | R(175) G(70) B(128) | R(175) G(27) B(128) |
| R(33) G(180) B(176) | R(104) G(95) B(176) | R(175) G(62) B(128) | R(175) G(45) B(80) |

DIGITAL DATA FALSE ALTERATION DETECTION PROGRAM AND DIGITAL DATA FALSE ALTERATION DETECTION APPARATUS

TECHNICAL FIELD

The present invention relates to a program and an apparatus for detecting a false alteration of digital data.

BACKGROUND OF THE INVENTION

An encryption technique called "the digital signature" is available as a method of detecting a false alteration of digital data. In this technique, the genuineness of digital data is determined by collating a hash. Generally, the hash is collated by producing a hash from the current data and comparing the particular hash with the original hash written in the header portion of the data.

This approach effectively functions in a completely closed system (a system other than a general-purpose system, using a special data format and having no fixed users), but cannot meet the requirement of an open system (a general-purpose system using an ordinary data format and assuming a multiplicity of unspecified users). This is by reason of the fact that once the file format is changed, the approach becomes inapplicable any longer.

Another approach called "the electronic watermark" is available. This concerns a method in which data not related to digital contents are buried in the digital contents or in which the data buried are extracted and collated. The "electronic watermark" requires such a structure that the buried data are not easily erased by the process of editing, compression, transmission or conversion of the contents and that the buried data cannot be easily falsely altered or overwritten with false information. In this method, the copyright information or the like, once buried, can be extracted even from falsely altered data, and therefore the originality of the data can be substantiated. Also, the falsely altered position can be detected by comparing the falsely altered data with the substantiated original data.

In this method, however, data are required to be buried in advance, and therefore a device for burying the data is required. Also, the buried data, which can be readily extracted as long as a burial method is known, has a low durability. Further, the data burial unavoidably deteriorates the data quality.

A digital image data acquisition device including an analog-to-digital converter, on the other hand, has a noise characteristic inherent to the analog-to-digital (A/D) conversion process.

The output signal of the CCD providing a photoelectric conversion device, for example, is structurally known to contain noises typically including what is called a lead-out noise constituting the total noises generated in a CCD element, an analog circuit of a control system and an A/D converter at the time of reading the charge of the CCD element and a dark charge noise due to the dark current generated in a well under the photoelectric surface of the CCD.

FIG. 1 is a diagram for explaining the noises contained in the output of a CCD element. FIG. 1(A) shows a digital image picked up with a lens cap attached to a digital camera which is frequency-converted using the two-dimensional FFT (Fast Fourier Transform), and FIG. 1(B) a solidly black digital image (O in digital value) produced using a digital image editing program and frequency-converted by the two-dimensional FFT. FIG. 1 indicates that the output data of the CCD element contains the noises in composite fashion.

The digital image data acquisition device including the A/D converter, on the other hand, has a characteristic inherent to the pixel value of the digital image data in the A/D conversion process.

DISCLOSURE OF THE INVENTION

Accordingly, the problem of the present invention is to provide a program and an apparatus which works effectively even in an open system by using a characteristic inherent to the A/D conversion process of a digital data acquisition device and detects a false alteration of digital data without any device for burying data in advance or extracting the buried data.

In order to solve the problem described above, according to a first aspect of the invention, there is provided a digital data false alteration detection program for causing a computer to detect the false alteration of the digital data acquired by a digital data acquisition device including a light detector or a sound detector and an A/D converter, characterized in that the computer is caused to execute:
 (a) a step of dividing the digital data into at least two or more small block data;
 (b) a step of extracting a noise inherent to the digital data acquisition device for each of the small block data;
 (c) a step of calculating the correlation of the noises between adjacent ones of the small block data; and
 (d) a step of detecting small block data having a noise correlation lower than a level predetermined for the surrounding small block data, as a falsely altered data.

In the configuration according to the first aspect of the invention, preferably, the step (b) includes the step of converting each of the small block data into a frequency domain and extracting the high-frequency component of each small block data as a noise inherent to the digital data acquisition device, or the step (b) includes the step of converting each of the small block data into a frequency domain and extracting a specific high-frequency component of the small block data as a noise inherent to the digital data acquisition device.

Also, preferably, the step (c) includes the step of calculating an accumulated value of the noises for each of the small block data and calculating the correlation of the noises from the difference of the accumulated value of the noises between adjacent ones of the small block data.

Further, in order to solve the problem described above, according to a second aspect of the invention, there is provided a digital data false alteration detection apparatus for causing a programmed computer to detect a false alteration of the digital data acquired by a digital data acquisition device including a light detector or a sound detector and an A/D converter, characterized by comprising a data divider for dividing the digital data into at least two small block data, a noise extraction unit for extracting a noise inherent to the digital data acquisition device for each of the small block data, and a false alteration detection unit for calculating the correlation of the noise between adjacent ones of the small block data and detecting a small block data with the noise correlation lower than a level predetermined for the surrounding small block data, as falsely altered data.

In the configuration according to the second aspect of the invention, preferably, the noise extraction unit converts each of the small block data into a frequency domain and extracts the high-frequency component of each small block data as a noise inherent to the digital data acquisition device. As an alternative, the noise extraction unit converts each of the small block data into a frequency domain and extracts a specific high-frequency component of each small block data as a noise inherent to the digital data acquisition device.

Also, preferably, the false alteration detection unit calculates an accumulated value of the noises for each of the small block data and calculates the correlation of the noises from the difference of the accumulated value of the noises between adjacent ones of the small block data.

More preferably, the data divider is adapted to divide the small block data into data of an arbitrary size. Also, the data divider is adapted to divide the digital data at an arbitrary position.

Also, in order to solve the problem described above, according to a third aspect of the invention, there is provided a digital image data false alteration detection program for causing a computer to detect a false alteration of the digital image data acquired by a digital image data acquisition device including an A/D converter, characterized in that the computer is caused to execute:
  (a) the step of extracting the noise characteristic of the pixel values of the digital image data; and
  (b) the step of comparing the extracted noise characteristic with the noise characteristic inherent to the A/D conversion process of the digital image data acquisition device, and based on the result of comparison, detecting a false alteration of the digital image data acquired by the digital image data acquisition device.

Also, in order to solve the problem described above, according to a fourth aspect of the invention, there is provided a digital image data false alteration detection apparatus for causing a programmed computer to detect a false alteration of the digital image data acquired by a digital image data acquisition device including an A/D converter, characterized by comprising an image data noise characteristic extraction unit for extracting the noise characteristic of the pixel values of the digital image data, and an image data false alteration detection unit for comparing the noise characteristic extracted by the image data noise characteristic extraction unit with the noise characteristic inherent to the A/D conversion process of the digital image data acquisition device and based on the result of comparison, detecting a false alteration of the digital image data acquired by the digital image data acquisition device.

Also, in order to solve the problem described above, according to a fifth aspect of the invention, there is provided a digital image data false alteration detection program for causing a computer to detect a false alteration of the digital image data acquired by a digital image data acquisition device including an A/D converter, characterized in that the computer is caused to execute:
  (a) the step of extracting the noise characteristic of the pixel values of the digital image data; and
  (b) the step of dividing the digital image data into at least two small blocks, comparing the noise characteristics between adjacent ones of the small blocks and upon development of an anomaly between the compared noise characteristics, detecting a false alteration of the digital image data acquired by the digital image data acquisition device.

Also, in order to solve the problem described above, according to a sixth aspect of the invention, there is provided a digital image data false alteration detection apparatus for causing a programmed computer to detect a false alteration of the digital image data acquired by a digital image data acquisition device including an A/D converter, characterized by comprising a noise characteristic extraction unit for extracting the noise characteristic of the pixel values of the digital image data, and a false alteration detection unit for dividing the digital image data into at least two small blocks, comparing the noise characteristics between adjacent ones of the small blocks based on the noise characteristic extracted by the noise characteristic extraction unit and upon development of an anomaly between the compared noise characteristics, detecting a false alteration of the digital image data acquired by the digital image data acquisition device.

Also, in order to solve the problem described above, according to a seventh aspect of the invention, there is provided a digital image data false alteration detection program for causing a computer to detect a false alteration of the digital image data acquired by a digital image data acquisition device including at least an A/D converter, characterized in that the computer is caused to execute:
  (a) the step of extracting the characteristic about the pixel values of the digital image data; and
  (b) the step of comparing the extracted characteristic with the characteristic inherent to the pixel value of the digital image data-in the A/D conversion process of the digital image data acquisition device and based on the result of comparison, detecting a false alteration of the digital image data acquired by the digital image data acquisition device.

In the configuration according to the seventh aspect of the invention, preferably, the step (a) includes the step of extracting a histogram about the pixel values of the acquired digital image data, and the step (b) includes the step of comparing the extracted histogram with the inherent histogram about the pixel values of the digital image data in the A/D conversion process of the digital image data acquisition device, and in the case where the inherent histogram assumes a continuous value while the extracted histogram assumes a discontinuous value, detecting a false alteration of the digital image data acquired by the digital image data acquisition device.

In the configuration according to the seventh aspect of the invention, preferably, the step (a) includes the step of dividing the acquired digital image data into at least two equal small blocks and extracting the array pattern of the pixel values of each small block, and the step (b) includes the step of detecting a false alteration of the digital image data in the case where the array patterns of the pixel values of the small blocks extracted in the step (a) are coincident with each other, as compared with the inherent characteristic that the probability that the array patterns of the pixel values of the small blocks coincide with each other is very low.

In the configuration according to the seventh aspect of the invention, preferably, the digital image data acquisition device includes an image acquisition device having a CCD, and the step (a) includes the step of extracting the pixel value of each pixel of the acquired digital image data, while the step (b) includes the step of calculating a predicted pixel value of each pixel of the digital image data by interpolation based on the CCD matrix array of the digital image data acquisition device from the pixel value of each pixel of the digital image data extracted in the step (a) and in the case where the pixel value of each pixel extracted in the step (a) fails to coincide with a corresponding predicted pixel value, detecting a false alteration of the digital image data.

Also, in order to solve the problem described above, according to an eighth aspect of the invention, there is provided a digital image data false alteration detection apparatus for causing a programmed computer to detect a false alteration of the digital image data acquired by a digital image data acquisition device including at least an A/D converter, characterized by comprising an image data characteristic extraction unit for extracting the characteristic about the pixel values of the digital image data, and an image data false alteration detection unit for comparing the characteristic extracted by the image data extraction unit with the characteristic inherent to the pixel value of the digital image data in the A/D conversion process of the digital image data acquisition device and based on the result of comparison, detecting a false alteration of the acquired digital image data.

In the configuration according to the eighth aspect of the invention, preferably, the image data characteristic extraction unit extracts a histogram about the pixel values of the acquired digital image data, and the image data false alteration detection unit compares the histogram extracted by the image data characteristic extraction unit with the histogram inherent to the pixel values of the digital image data in the A/D conversion process of the digital image data acquisition device, and in the case where the inherent histogram assumes a continuous value while the histogram extracted by the image data characteristic extraction unit assumes a discontinuous value, detects a false alteration of the digital image data acquired by the digital image data acquisition device.

In the configuration according to the eighth aspect of the invention, preferably, the image data characteristic extraction unit divides the acquired digital image data into at least two or more equal small blocks and extracts the array pattern of the pixel values of each small block, and the image data false alteration detection unit detects a false alteration of the digital image data in the case where the array patterns of the pixel values of the small blocks extracted by the image data characteristic extraction unit are coincident with each other, as compared with the inherent characteristic that the probability that the array patterns of the pixel values of the small blocks coincide with each other is very low.

In the configuration according to the eighth aspect of the invention, preferably, the digital image data acquisition device includes an image acquisition device having a CCD, and the image data characteristic extraction unit extracts the pixel value of each pixel of the acquired digital image data, while the image data false alteration detection unit calculates a predicted pixel value of each pixel of the digital image data by interpolation based on the CCD matrix array of the digital image data acquisition device from the pixel value of each pixel of the digital image data extracted by the image data characteristic extraction unit, and in the case where the pixel value of each pixel extracted by the image data characteristic extraction unit fails to coincide with a corresponding predicted pixel value, detects a false alteration of the digital image data.

Also, in order to solve the problem described above, according to a ninth aspect of the invention, there is provided a digital image data false alteration detection program for causing a computer to detect a false alteration of the digital image data acquired by a digital image data acquisition device, characterized in that the computer is caused to execute:

the step of detecting a focused area in an image based on the digital image data, and upon determination that two or more areas are detected and spaced from each other by at least a predetermined distance, detecting a false alteration of the digital image data.

Also, in order to solve the problem described above, according to a tenth aspect of the invention, there is provided a digital image data false alteration detection system for causing a programmed computer to detect a false alteration of the digital image data acquired by a digital image data acquisition device, characterized by comprising a focused area detection unit for detecting focused areas in an image based on the digital image data, and a false alteration detection unit for detecting a false alteration of the digital image data upon determination, based on the positions, in the image, of the areas detected by the focused area detection unit, that a plurality of the areas exist and are spaced from each other by a predetermined distance.

BRIEF DESCRIPTION OF THE DRAWINGS

FIGS. 27(A) to (D) are diagrams showing array patterns of the image portions 1 to 4 in FIG. 26(B) after equally dividing the image of FIG. 26(B) into small blocks and extracting the array pattern of the pixel values of the small blocks.

FIG. 29 is a diagram showing a CCD matrix.

FIG. 30(A) is a diagram showing an example of the pixel values detected by a portion of the CCD matrix shown in FIG. 29.

FIG. 30(B) is a list of the CCD devices of a portion of the CCD matrix of FIG. 29 which are numbered by way of explanation.

FIG. 31(A) is a diagram showing the pixel values of a digital image picked up with a portion of the CCD matrix shown in FIG. 29 and not falsely altered.

FIG. 31(B) is a diagram showing the pixel values of the image of FIG. 31(A) falsely altered by the Gaussian shading.

FIG. 32(A) is a diagram showing the pixel values assumed to have been detected by the corresponding CCD devices from the pixel values shown in FIG. 31(B).

FIG. 32(B) is a diagram showing the predicted pixel values calculated from the pixel values shown in FIG. 32(A).

BEST MODE FOR CARRYING OUT THE INVENTION

Figure 1:
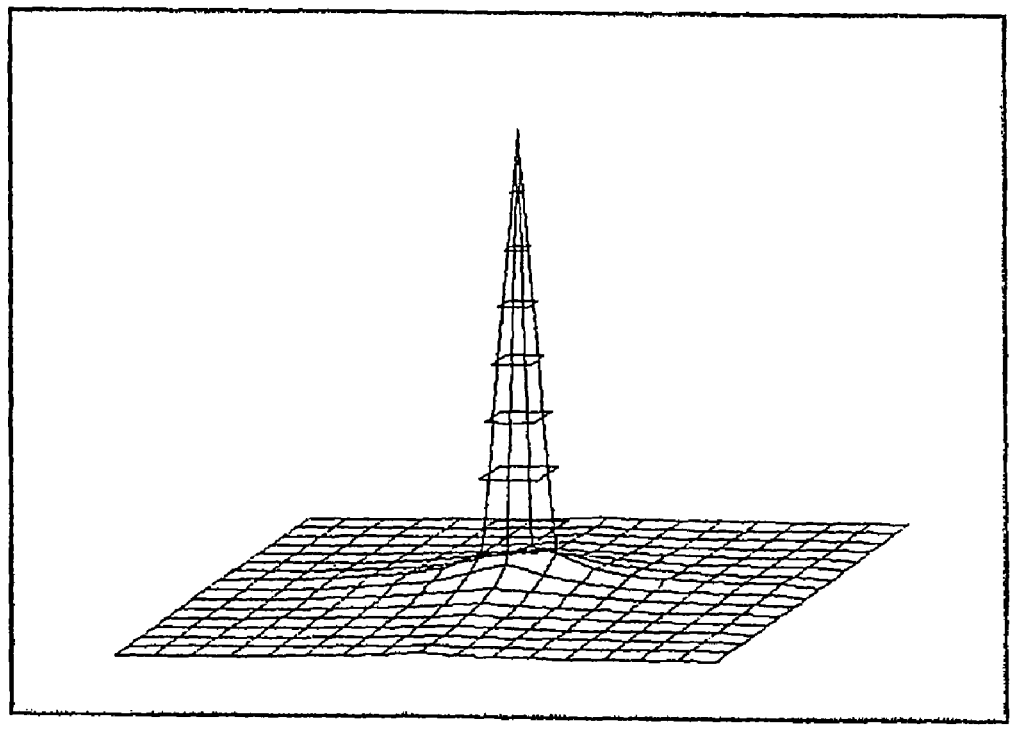
FIG. 1 is a diagram for explaining the output noises of a CCD device, in which (A) shows a digital image picked up by a digital camera with a lens cap, as frequency-converted using the two-dimensional FFT, and (B) shows a solidly black digital image (zero in digital value) produced according to a digital image editing program, as frequency-converted using the two-dimensional FFT.
Figure 1:
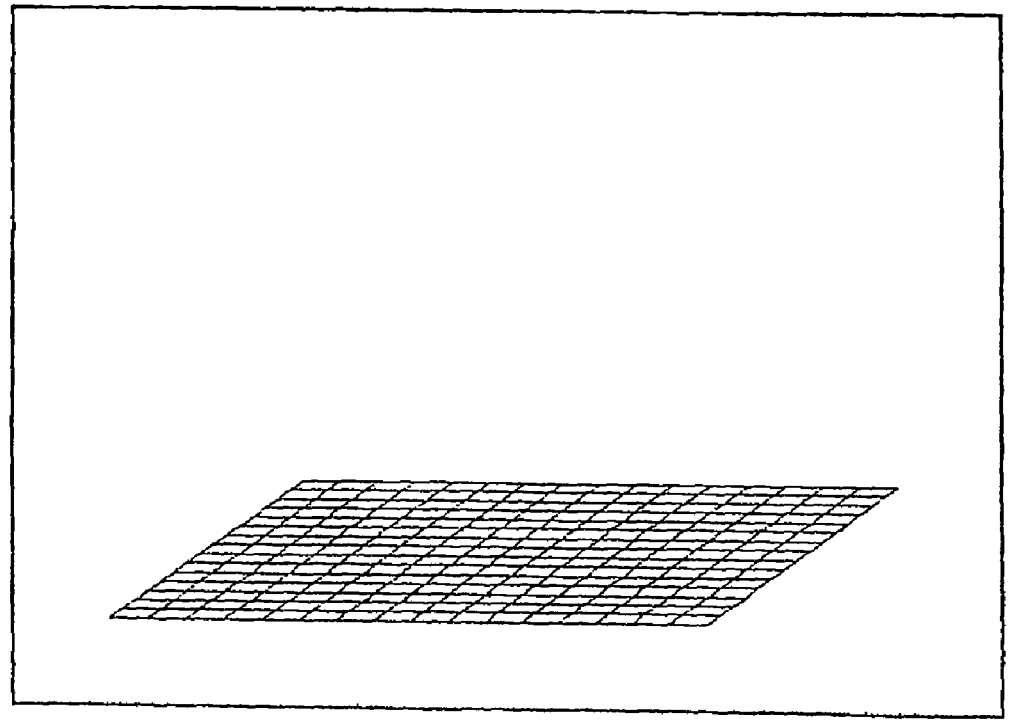
Figures 2, 3:
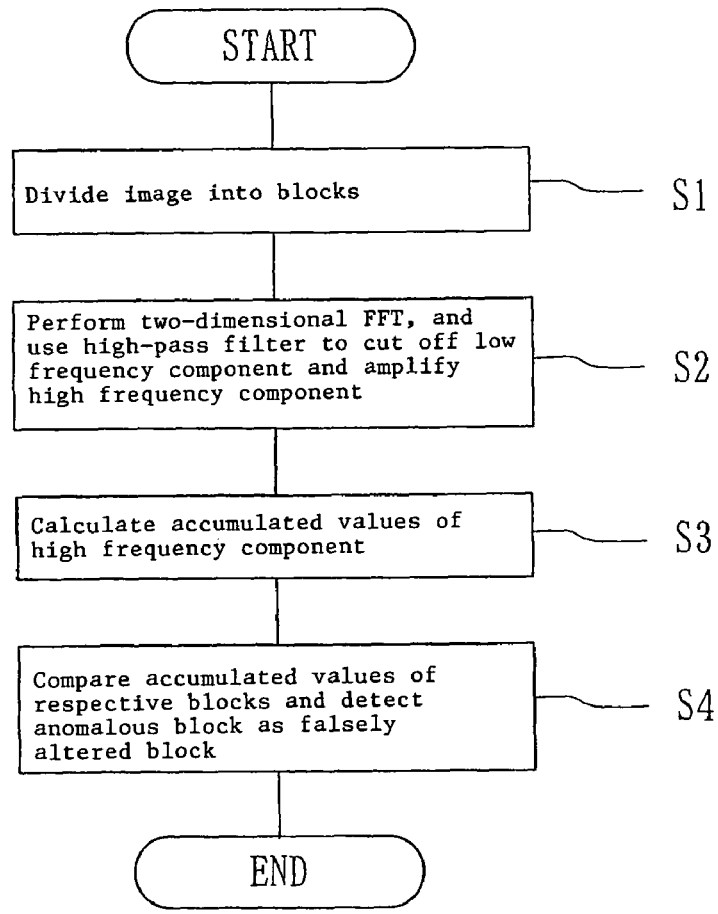
FIG. 2 is a flowchart of the digital data false alteration detection program according to a first embodiment in the first aspect of the invention.
FIG. 3 is a diagram showing a state in which a digital image is divided into small block images.

Preferred embodiments of the invention are described below with reference to the accompanying drawings. FIG. 2 is a flowchart of the digital data false alteration detection program according to an embodiment in the first aspect of the invention. According to this embodiment, the digital data is formed of a digital image. With the digital data false alteration detection program according to this invention, the computer first divides the digital image of which a false alteration is to be detected, into a plurality of small block images by a computer, as shown in FIG. 3 (step S1 in FIG. 2). In this example, as apparent from FIG. 3, the digital image is divided into eight small blocks in horizontal direction and five small blocks in vertical direction for a total of 40 small block images B001 to B040.

Next, each of the small block images divided in step S1 is converted into a frequency domain using the two-dimensional FFT (Fast Fourier Transform) by the computer, and the low-frequency component is cut off by a high-pass filter while amplifying the high-frequency component (step S2 in FIG. 2). The accumulated value of the high-frequency component is determined for each small block image (step S3 in FIG. 2). Further, the accumulated value of each small block image is compared, and a small block image having an anomalous value is detected as a falsely altered image (step S4 in FIG. 2). In step S4, preferably, the average of the accumulated value of the small block images is calculated, and the absolute value of the difference between the accumulated value and the average value divided by the standard deviation is calculated for each small block image, so that a block 3 or more off in standard deviation is detected as a small block image having an anomalous value.

Figure 4:
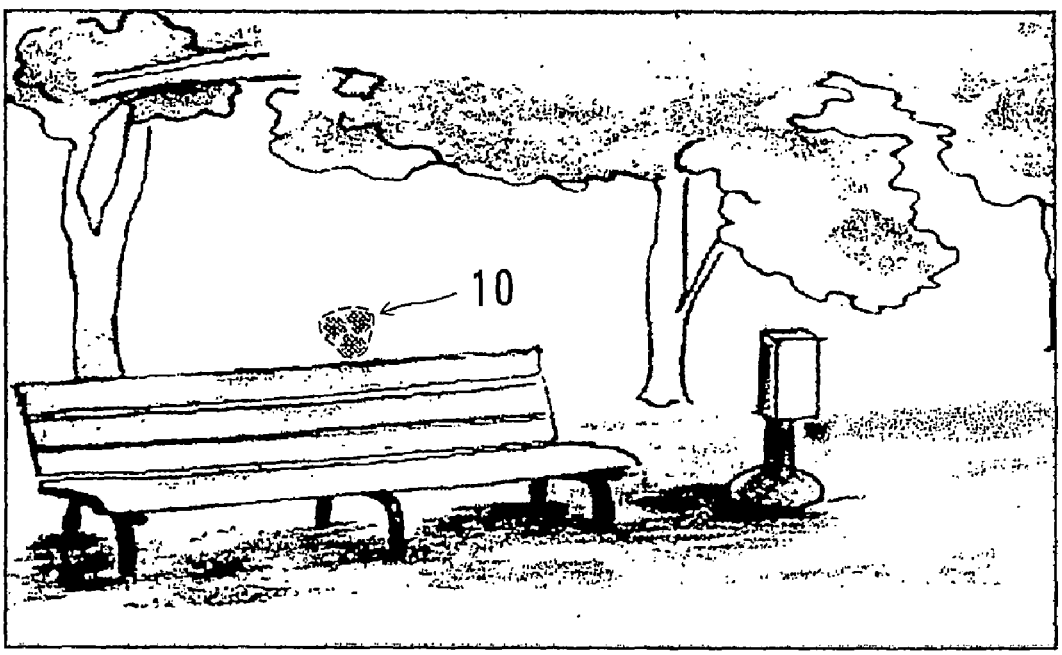
FIG. 4 is a diagram showing an example of the digital image, in which (A) shows a falsely altered digital image, and (B) an original digital image not falsely altered.
Figure 4:
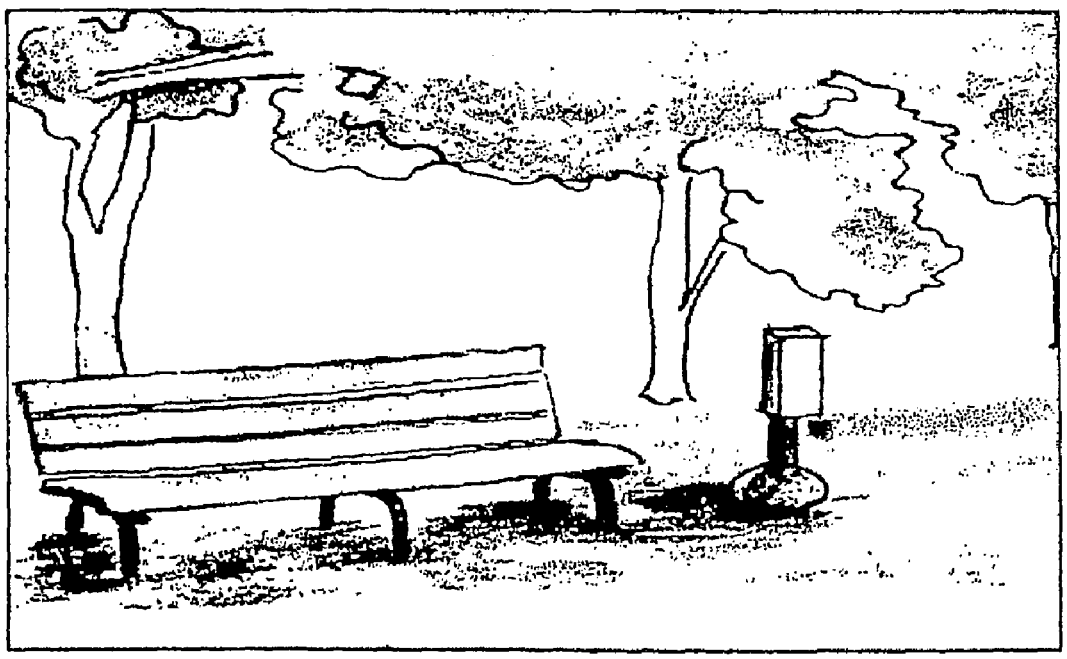

As a specific example, an explanation is given about a case in which a digital data false alteration detection program according to this invention is installed in the computer and used for the digital image actually picked up by a digital camera. FIG. 4(B) shows an example of the digital image picked up by a digital camera and not falsely altered, and FIG. 4(A) the digital image of FIG. 4(B) partially "shaded" according to the digital image editing program. In FIG. 4(A), reference numeral 10 designates a portion subjected to the "shading" process. The portion 10 in FIG. 4(A) corresponds to the small block image B019 in FIG. 3.

Figure 5:
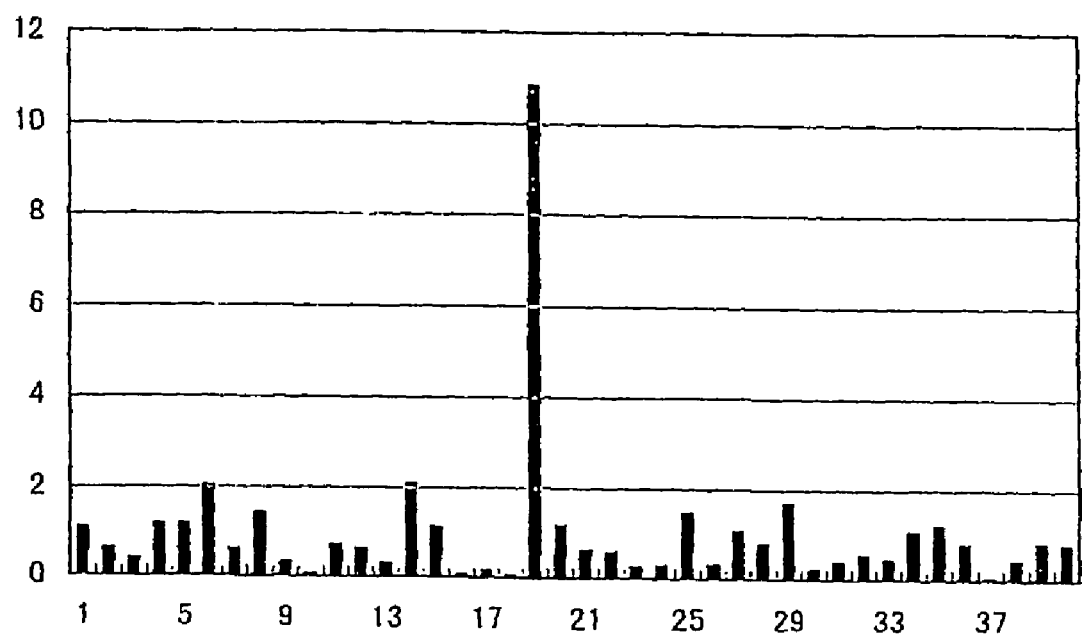
FIG. 5 is a graph showing an average accumulated value of the high-frequency components of the small block image in the digital image versus the variations of the accumulated value of the high-frequency components of the small block images, in which (A) corresponds to the digital image of FIGS. 4(A) and (B) corresponds to FIG. 4(B).
Figure 5:
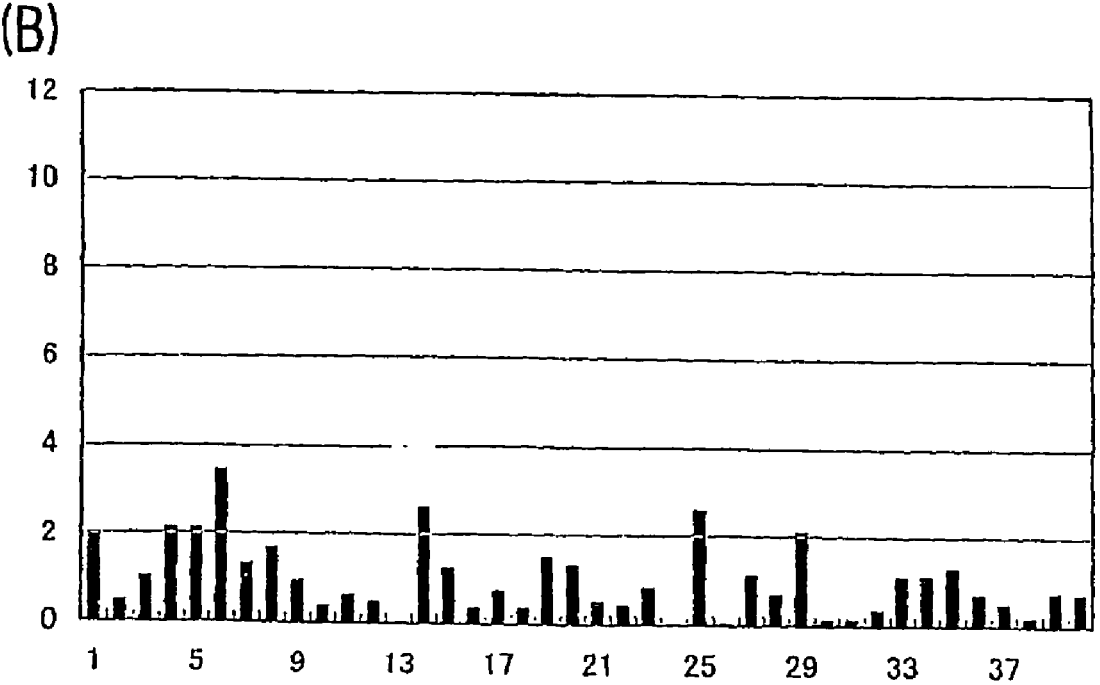

FIG. 5 is a graph showing the average accumulated value of the high-frequency components of the small block images of the digital image versus the variation of the accumulated value of the high-frequency component of each small block image, obtained by the computer. (A) corresponds to the digital image of FIGS. 4(A), and (B) corresponds to FIG. 4(B). In FIG. 5, the ordinate represents the absolute value of the difference between the average accumulated value of the small block imaged and the accumulated value of each small block image divided by the standard deviation, and the abscissa the number of each small block. As apparent from FIG. 5, the block B019 of which the data is falsely altered may be detected as a block of an anomalous accumulated value of the high-frequency component.

In this way, with the digital data false alteration detection program according to this invention, the computer is caused to detect a false alteration, if any, based on the noises mixed at the time of acquisition of the digital image. Therefore, a false alteration of the digital image can be detected without using a device for adding extraneous data such as an electronic watermark to the digital image of which a false alteration is to be detected.

Figure 6:
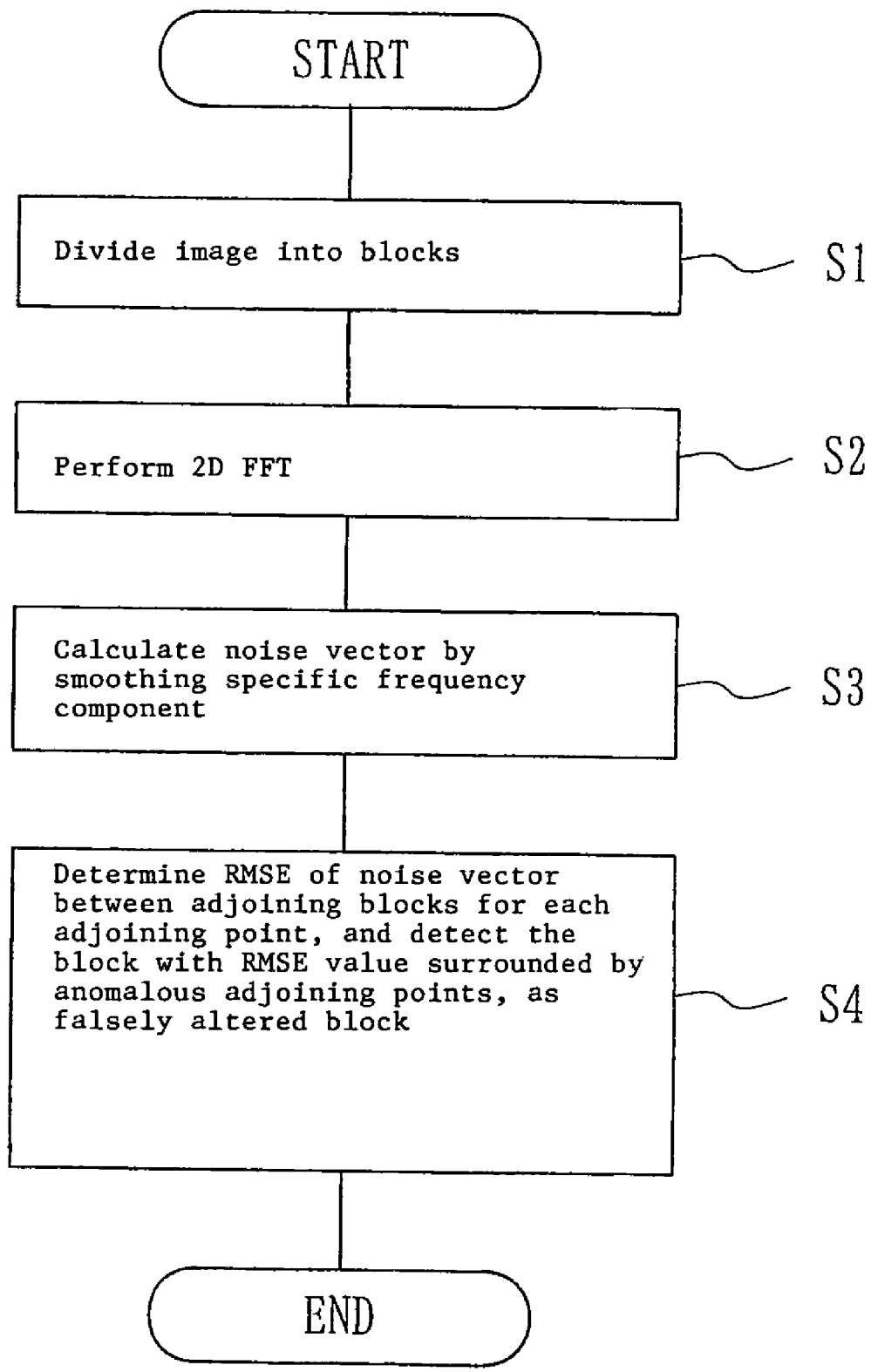
FIG. 6 is a flowchart of a digital data false alteration detection program according to another embodiment in the first aspect of the invention.
Figure 7:
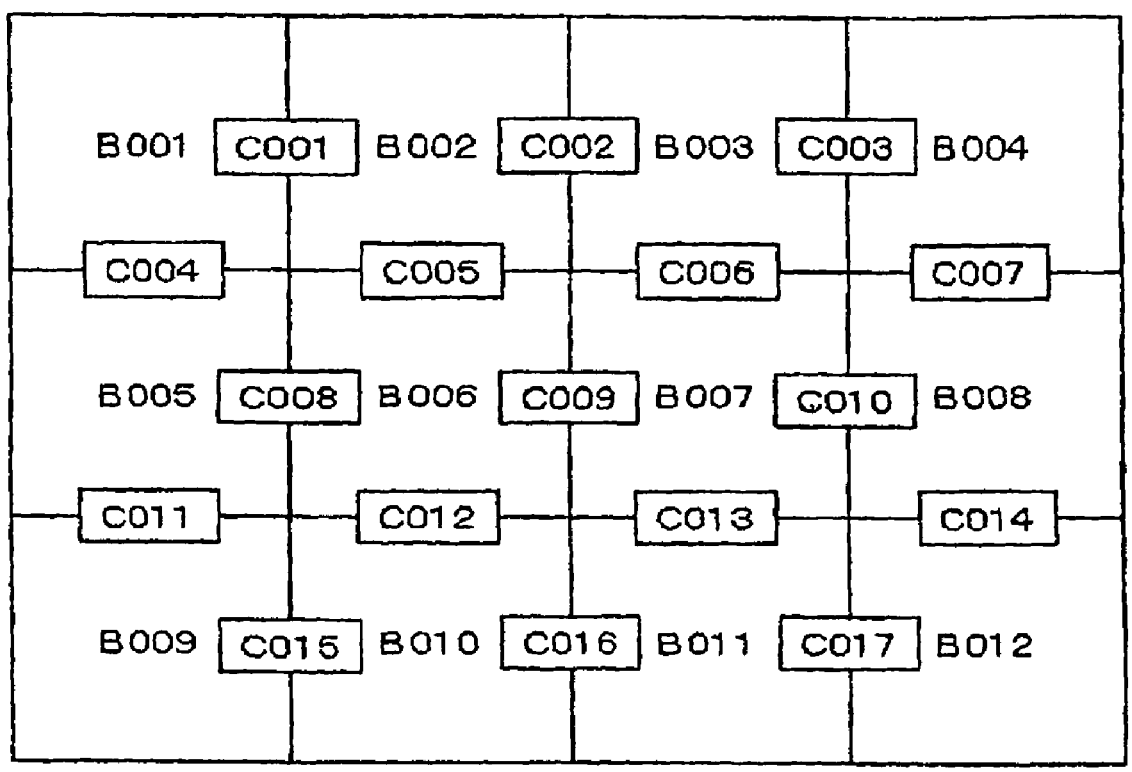
FIG. 7 is a diagram showing a state in which a digital image is divided into small block images.

FIG. 6 is a flowchart for the digital data false alteration detection program according to another embodiment in the first aspect of the invention. In this embodiment, the digital data is formed of a digital image. With the digital data false alteration detection program according to this aspect of this invention, the computer first divides the digital image of which a false alteration is to be detected, into a plurality of small block images as shown in FIG. 7 (step S1 in FIG. 6). In this example, as apparent from FIG. 7, the digital image is divided into four blocks in horizontal direction and three blocks in vertical direction for a total of 12 small block images B001 to B012. Also, the small block images are adjacent to other small block images at the adjoining points C001 to C017, respectively.

Figure 8:
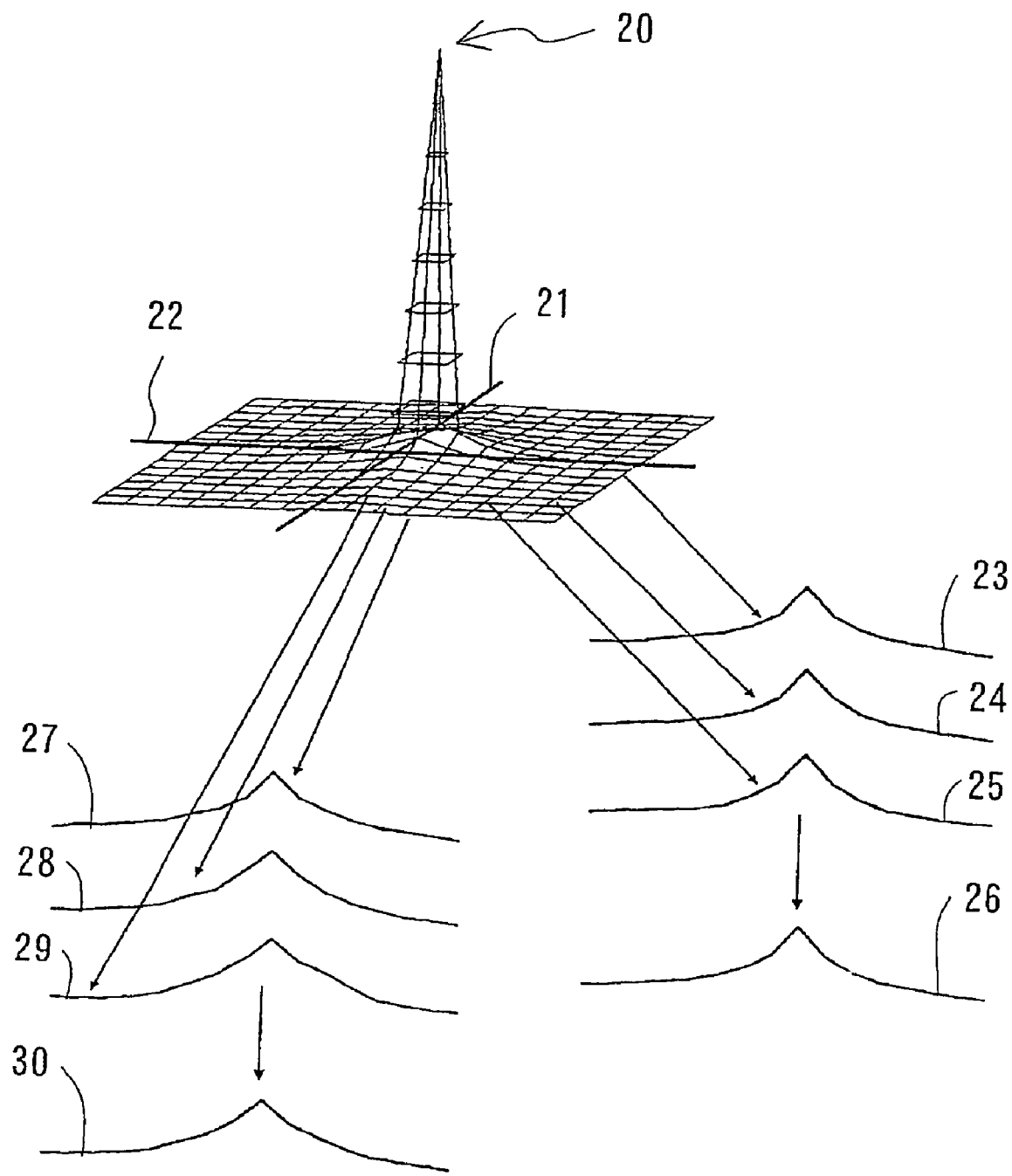
FIG. 8 is a graph showing the spectrum obtained by two-dimensional FFT.

Next, the computer converts each of the small block images into which the digital image is divided in step S1, into a frequency domain using the two-dimensional FFT (step S2 in FIG. 6). FIG. 8 is a graph of the spectrum obtained by the two-dimensional FFT. In FIG. 8, the center peak 20 represents a DC component, and the higher the frequency, the farther from the peak 20.

The computer smoothes a specific frequency component of all the small block images B001 to B012 and thus calculates a noise spectrum (step S3 in FIG. 6). In smoothing a specific frequency component, frequency vectors 23, 24, 25 in a specific domain are picked out and averaged out along the ordinate 21 in FIG. 8, so that a spectrum 26 representing the particular domain is obtained. Also, along the abscissa 22, frequency spectra 27, 28, 29 in a specific domain are picked out and averaged out, so that a noise spectrum 30 representing the particular domain is obtained.

Further, the computer determines the Euclidean distance (RMSE: Root Mean Square Error), for each of the adjoining points C001 to C017, of the noise spectrum between adjoining blocks at the particular adjoining point and detects the block surrounded by adjoining points having an anomalous RMSE value, as a falsely altered block (step S4 in FIG. 6).

As a specific example, an explanation is given about a case in which the digital data false alteration detection program according to the invention is installed in the computer and used for a digital image actually picked up by a digital camera. Also in this case, the same digital image as FIG. 4(B) is used as a digital image not falsely altered. On the other hand, a part of the digital image shown in FIG. 4(B), which is subjected to "the shading" process by the digital image editing program at a position corresponding to the block B007 in FIG. 7, is used as a digital image falsely altered.

Figure 9:
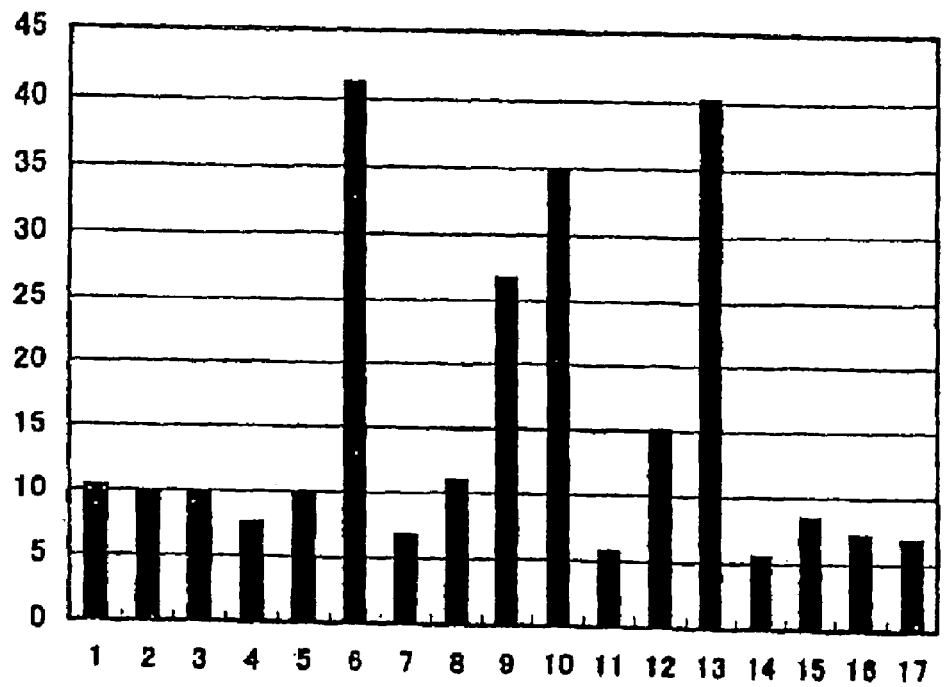
FIG. 9 is a graph showing RMSE for each adjacent points, in which (A) is a graph corresponding to a falsely altered digital image, and (B) a graph corresponding to a digital image not falsely altered.
Figure 9:
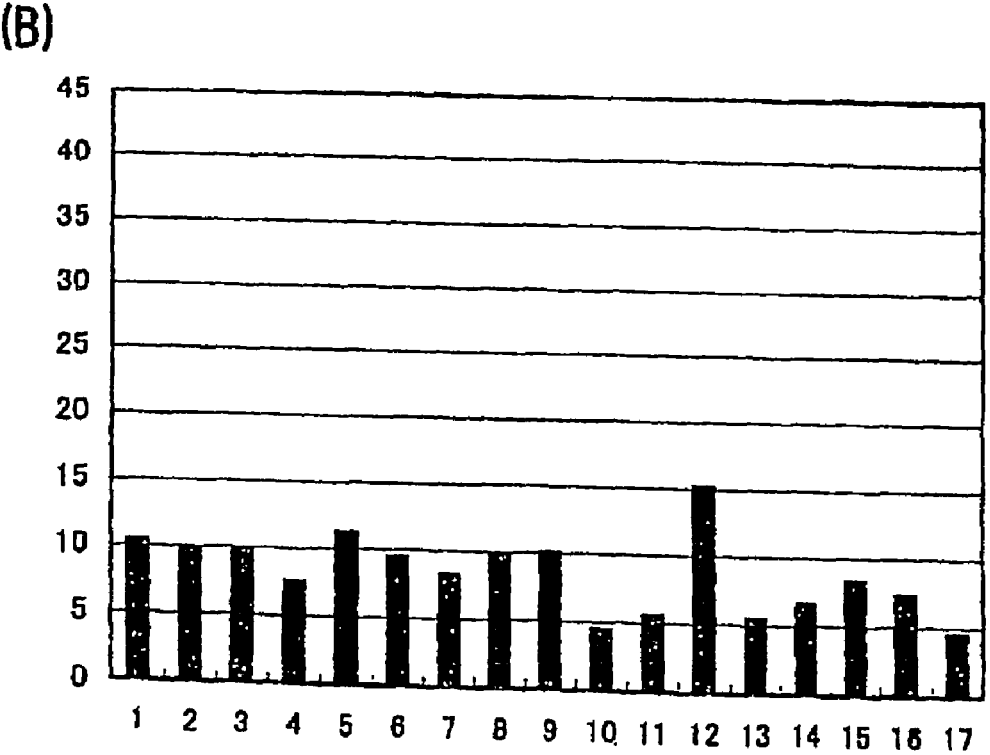

FIG. 9 is a graph showing the RMSE for each adjoining point determined in step S4. (A) is a graph corresponding to a digital image falsely altered, and (B) a graph corresponding a digital image not falsely altered. In FIG. 9, the ordinate represents the RMSE value, and the abscissa the number of each adjoining point. As apparent from FIG. 9, the block B007 surrounded by the adjoining points C006, C009, C010, C013 having an anomalous RMSE value can be detected as a block with a falsely altered data.

Also in this embodiment, similar effects to the embodiment shown in FIG. 2 are obtained.

Figure 10:
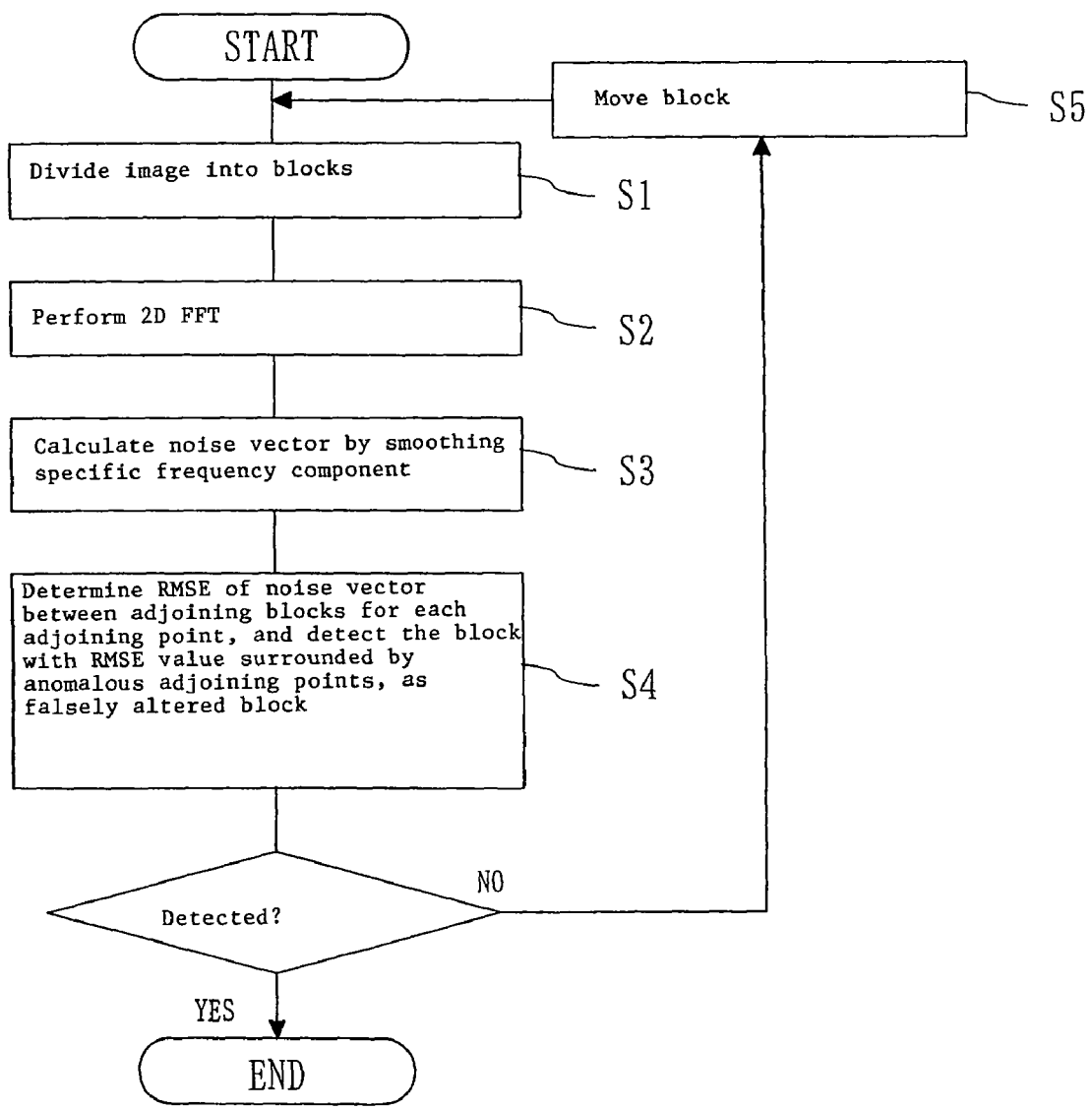
FIG. 10 is a flowchart of a digital data false alteration detection program according to still another embodiment in the first aspect of the invention.

FIG. 10 is a flowchart for the digital data false alteration detection program according to another embodiment in the first aspect of the invention. With the digital data false alteration detection program according to this aspect of the invention, the computer first divides the digital image of which a false alteration, if any, is to be detected, into a plurality of small block images as shown in FIG. 7, in the same manner as in the embodiment shown in FIG. 6 (step S1 in FIG. 10). Next, the computer converts each of the small blocks divided in step S1 into a frequency domain using the two-dimensional FFT (step S2 in FIG. 10). As the result of this two-dimensional FFT, as in the case of the embodiment shown in FIG. 6, a graph of spectrum as shown in FIG. 8 is obtained.

Then, the computer smoothes a specific frequency component, in the same manner as in the embodiment shown in FIG. 6, for all the small block images B001 to B012 thereby to calculate a noise vector (step S3 in FIG. 10). After that, for each adjoining point, the Euclidean distance (RMSE) of the noise vector between the blocks adjoining the particular adjoining point, and a block with the RMSE value surrounded by the anomalous adjoining points is detected as a falsely altered block (step S4 in FIG. 10). In the case where no anomalous adjoining point is detected, the computer changes both the size of the divided block and the position of dividing the digital image thereby to move the divided block (step S5 in FIG. 10). Then, steps S1 to S4 are repeated.

Figure 11:
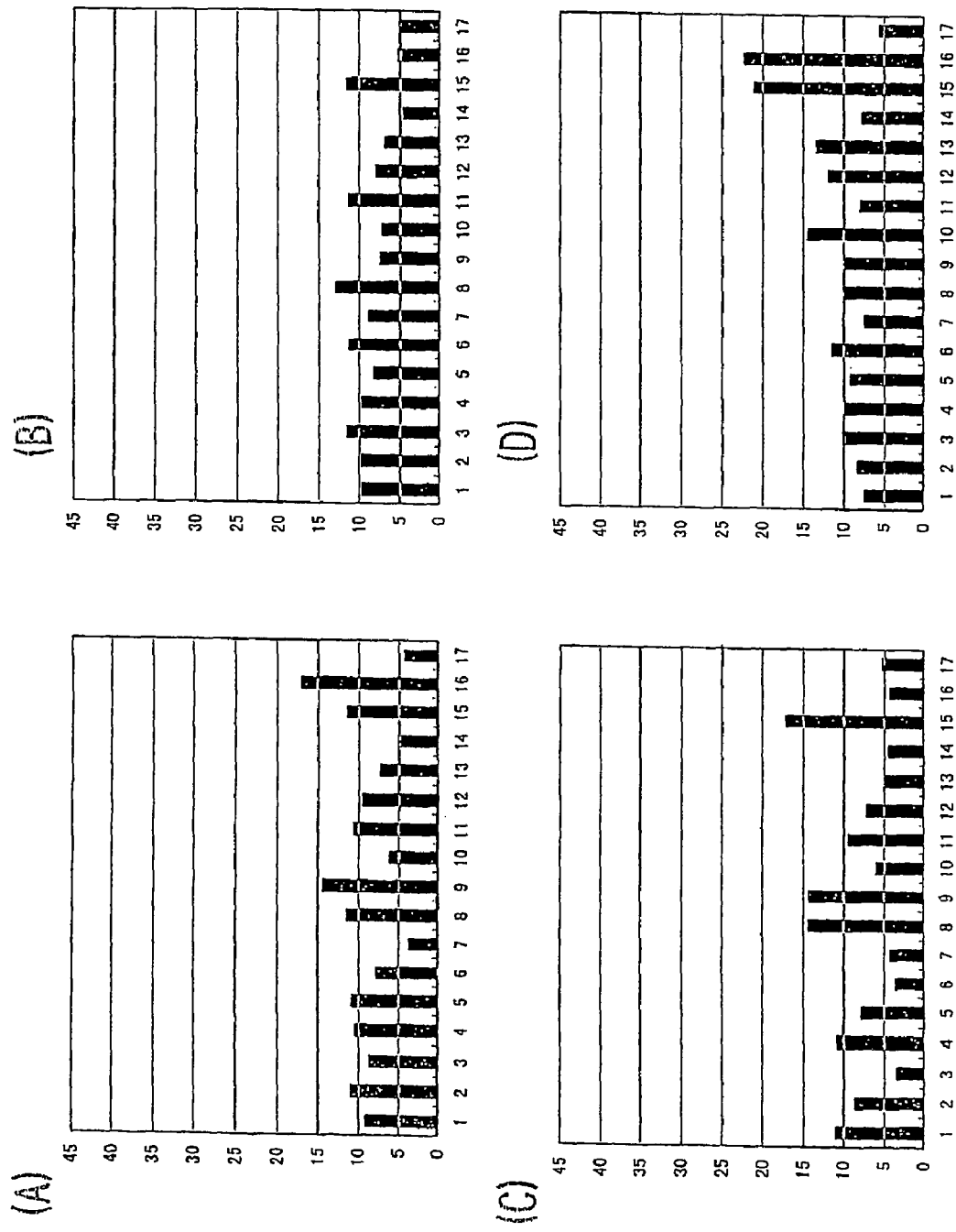
FIG. 11 is a graph showing the RMSE value for each adjoining point, in which (A) to (D) correspond to a falsely altered digital image.

As a specific example, a case is explained in which the digital data false alteration detection program according to the invention is installed in the computer and used actually for the digital image picked up by a digital camera. Also in this example, the same digital image as in FIG. 4(B) is used as a digital image not falsely altered. A part of the digital image of FIG. 4(B), which is subjected to the "shading" process by the digital image editing program at a position corresponding to the block B007 in FIG. 7, for example, is used as a digital image falsely altered. FIGS. 11 and 12 are graphs showing the RMSE value for each adjoining point determined in step S4. FIG. 11(A) is a graph in which the "shading" process covers the blocks B002, B003, B006, B007 in the digital image falsely altered, FIG. 11(B) a graph in which the "shading" process covers the blocks B003, B004, B007, B008 in the digital image falsely altered, FIG. 11(C) a graph in which the "shading" process covers the blocks B005, B006 in the digital image falsely altered, and FIG. 11(D) a graph in which the "shading" process covers the blocks B007, B008 in the digital image falsely altered. Also, FIG. 12(A) is a graph in which the "shading" process covers only the block B007 in the digital image falsely altered, FIG. 12(B) a graph in which the "shading" process covers the blocks B007, B008 in the digital image falsely altered, and FIG. 12(C) a graph corresponding to the digital image not falsely altered.

Figure 12:
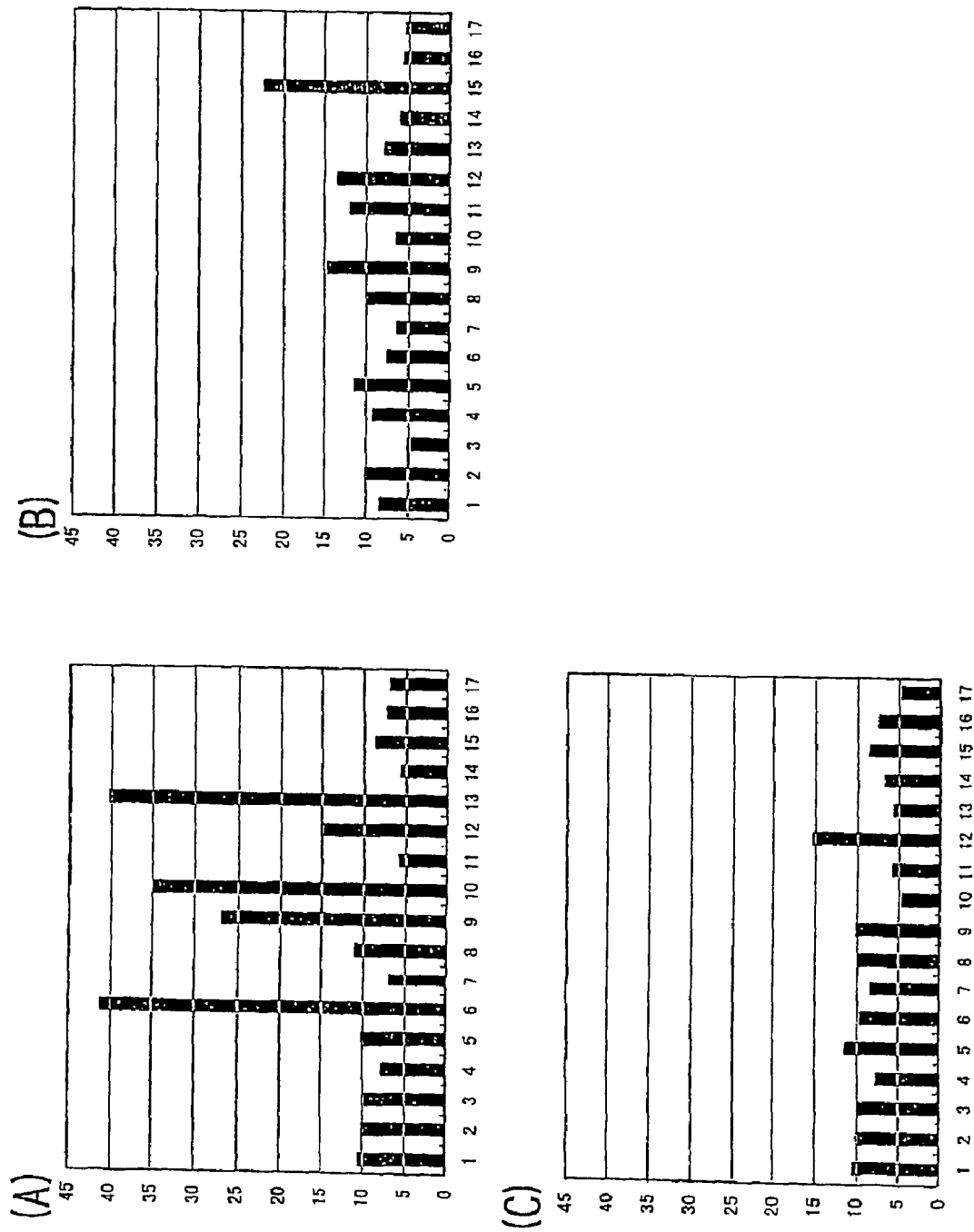
FIG. 12 is a graph showing the RMSE value for each adjoining point, in which (A) and (B) correspond to falsely altered digital data, and (C) corresponds to an original digital image not falsely altered.

As seen from FIGS. 11 and 12, an adjoining point having an anomalous RMSE value is detected in the case of FIG. 12(A), in which a block with the data thereof falsely altered can be detected by moving the divided blocks.

Although the digital image is converted to a frequency domain by FFT in all the embodiments described above, the digital image can be converted to a frequency domain alternatively by the wavelet conversion, DCT (Discrete Cosine Transform) or DST (Discrete Sine Transform) with equal effect.

Figure 13:
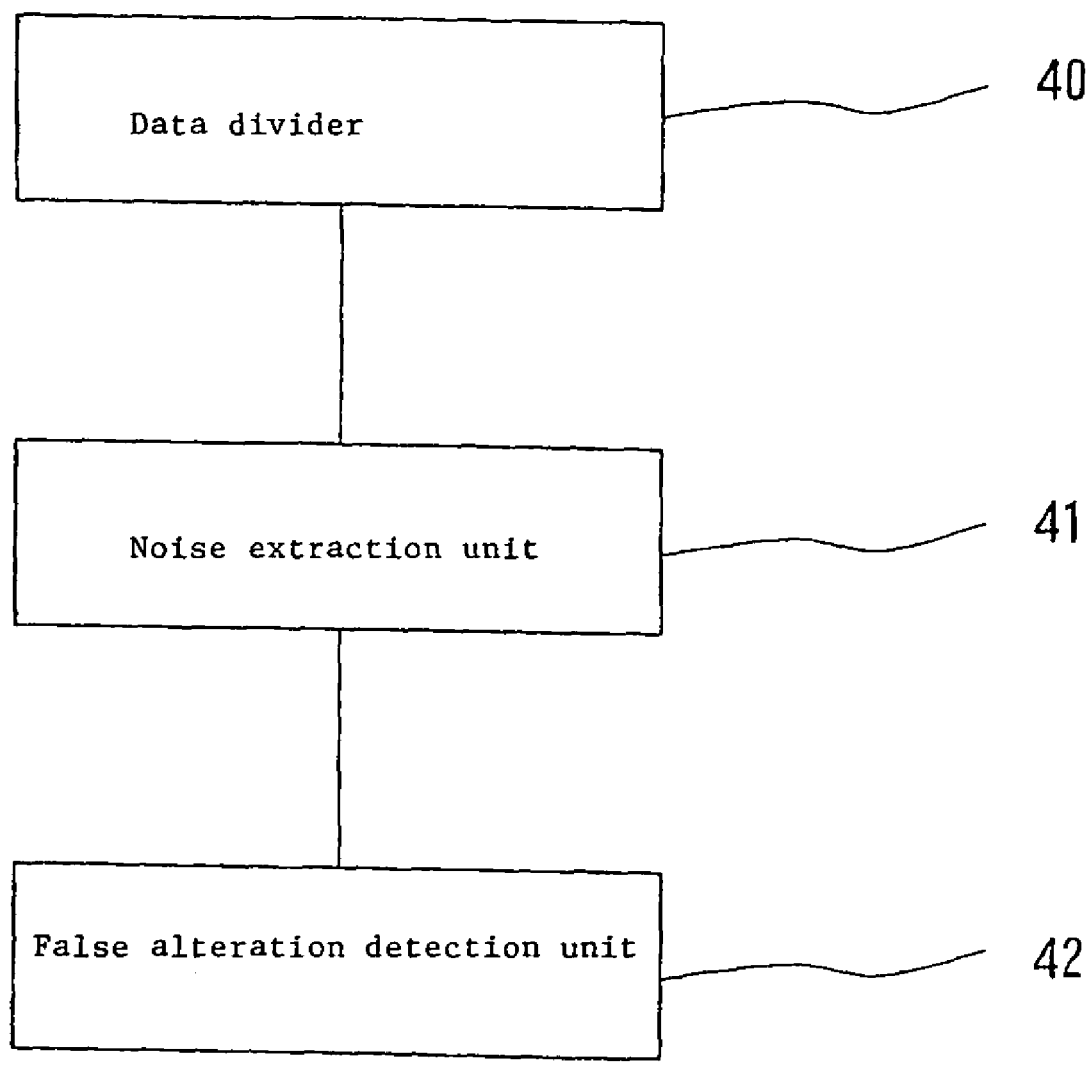
FIG. 13 is a block diagram showing a general configuration of a digital data false alteration detection apparatus according to an embodiment in the second aspect of the invention.

FIG. 13 is a block diagram showing a general configuration of a digital data false alteration detection apparatus according to a first embodiment in the second aspect of the invention. The apparatus according to this aspect of the invention comprises, as shown in FIG. 13, a programmed computer, a data divider 40 for dividing the digital data into a plurality of small block data, a noise extraction unit 41 for extracting a noise inherent to the digital data acquisition device for each small block data, and a false alteration detection unit 42 for calculating a noise correlation between adjoining small block data and detecting small block data having a noise correlation lower than a level predetermined for the surrounding small block data, as falsely altered data.

The noise extraction unit 41 converts each of the small block data into a frequency domain and extracts the high-frequency component of each small block data as a noise inherent to the digital data acquisition device, or converts each of the small block data into a frequency domain and extracts a specific frequency component of each small block data as a noise inherent to the digital data acquisition device.

The false alteration detection unit 42 calculates an accumulated value of noises for each small block data, and thus calculates a noise correlation from the difference of the accumulated noise value between the adjoining small block data.

The data divider 40 is adapted to divide the small block data into blocks of an arbitrary size and the digital data at an arbitrary position.

According to still another embodiment in this aspect of the invention, the digital data false alteration detection program according to the invention is used for the digital sound data. As compared with the embodiment of FIG. 2 in which the data are two-dimensionally processed, this embodiment is different only in that the data are processed one-dimensionally.

In this embodiment, therefore, the digital data false alteration detection program according to the invention has a flow similar to that of FIG. 2. By use of the digital data false alteration detection program according to this invention, the computer first divides the digital sound data of which a false alteration is to be detected, into a plurality of small blocks. In the example under consideration, the digital sound data are divided into 132 parts one-dimensionally for a total of 132 small blocks D001 to D132.

Next, the computer converts each small block division to a frequency domain using the one-dimensional FFT, while at the same time cutting off the low-frequency component thereof with a high-pass filter thereby to amplify the high-frequency component. Then, an accumulated value of the high-frequency component is determined for each small block. Further, the average accumulated value of each small block is calculated, and by calculating the absolute value of the difference between the accumulated value and the average value, divided by the standard deviation, each block with the standard deviation different by 3 or more is detected as a block having an anomalous value.

As a specific example, an explanation is given of a case in which the digital data false alteration detection program according to the invention is installed in the computer and used for the voice data actually recorded by microphone. The voice data synthesized by the computer and mixed at a position corresponding to the block D028 of the original voice data recorded is used as a falsely altered voice data.

Figure 14:
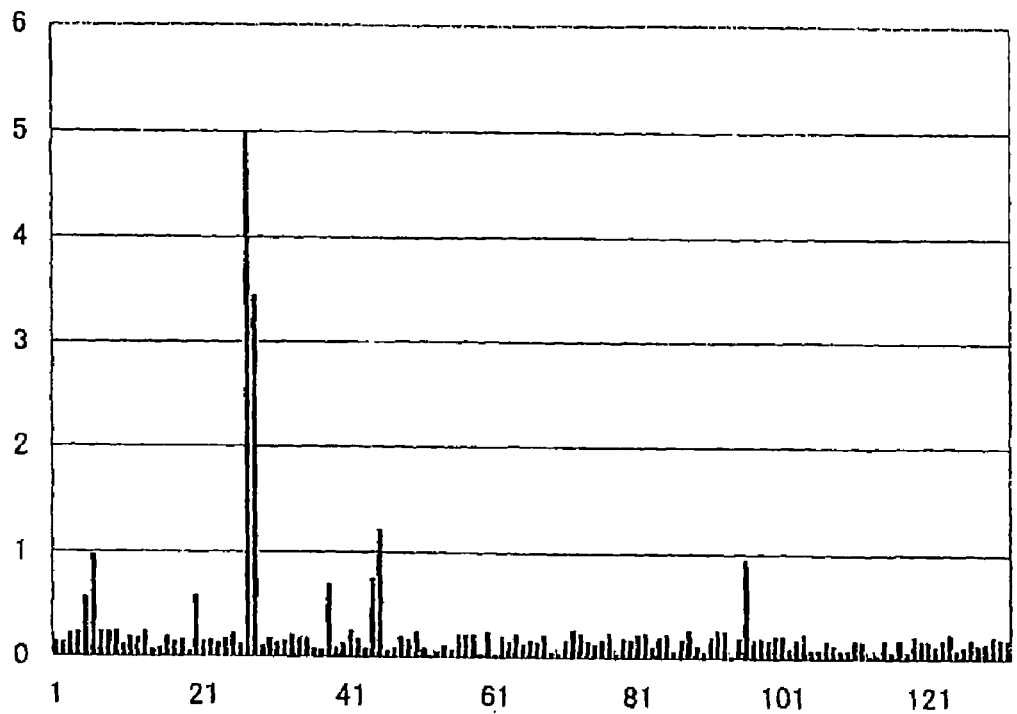
FIG. 14 is a graph showing an average accumulated value of the high-frequency components of the small blocks in the voice data obtained by a computer versus the variations of the accumulated values of the high-frequency components of the small blocks, in which (A) corresponds to the falsely altered voice data and (B) corresponds to the original voice data.
Figure 14:
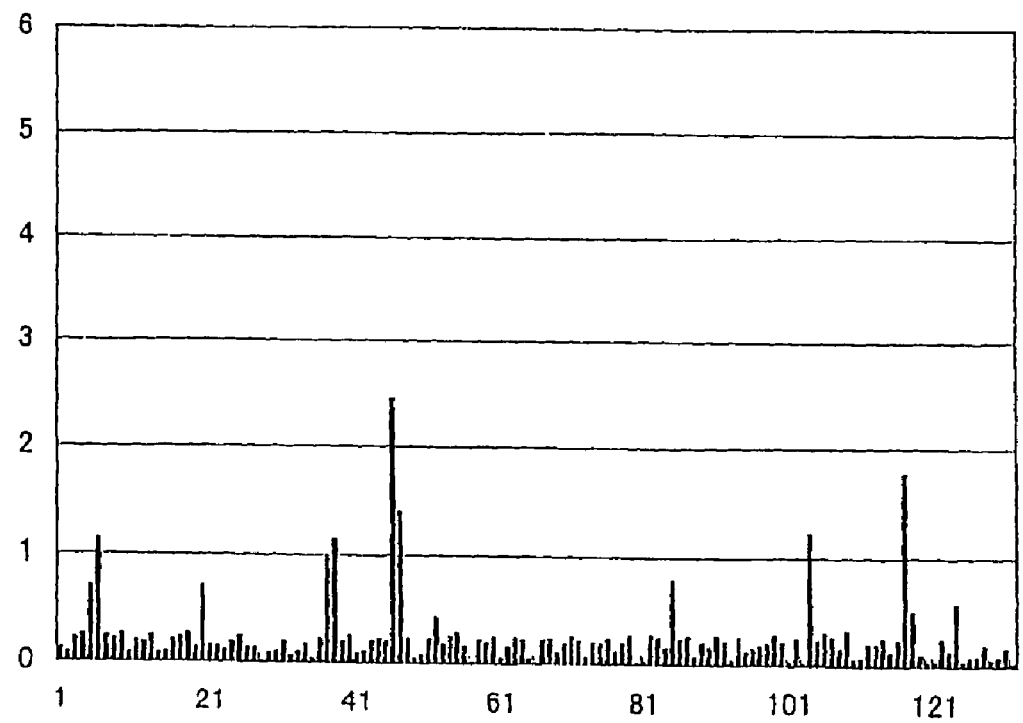

FIG. 14 is a graph, obtained by the computer, showing the average accumulated value of the high-frequency component of the small blocks of the voice data versus the variation of the accumulated value of the high-frequency component of each small block image. (A) corresponds to the voice data falsely altered, and (B) corresponds to the original voice data. In FIG. 14, the ordinate represents the absolute value of the difference between the average accumulated value of the small blocks and the accumulated value of each small block, divided by the standard deviation, and the abscissa the number of each small block. As apparent from FIG. 14, the block B028 of which the data is falsely altered may be detected as a block having an anomalous accumulated value of the high-frequency component.

Figure 15:
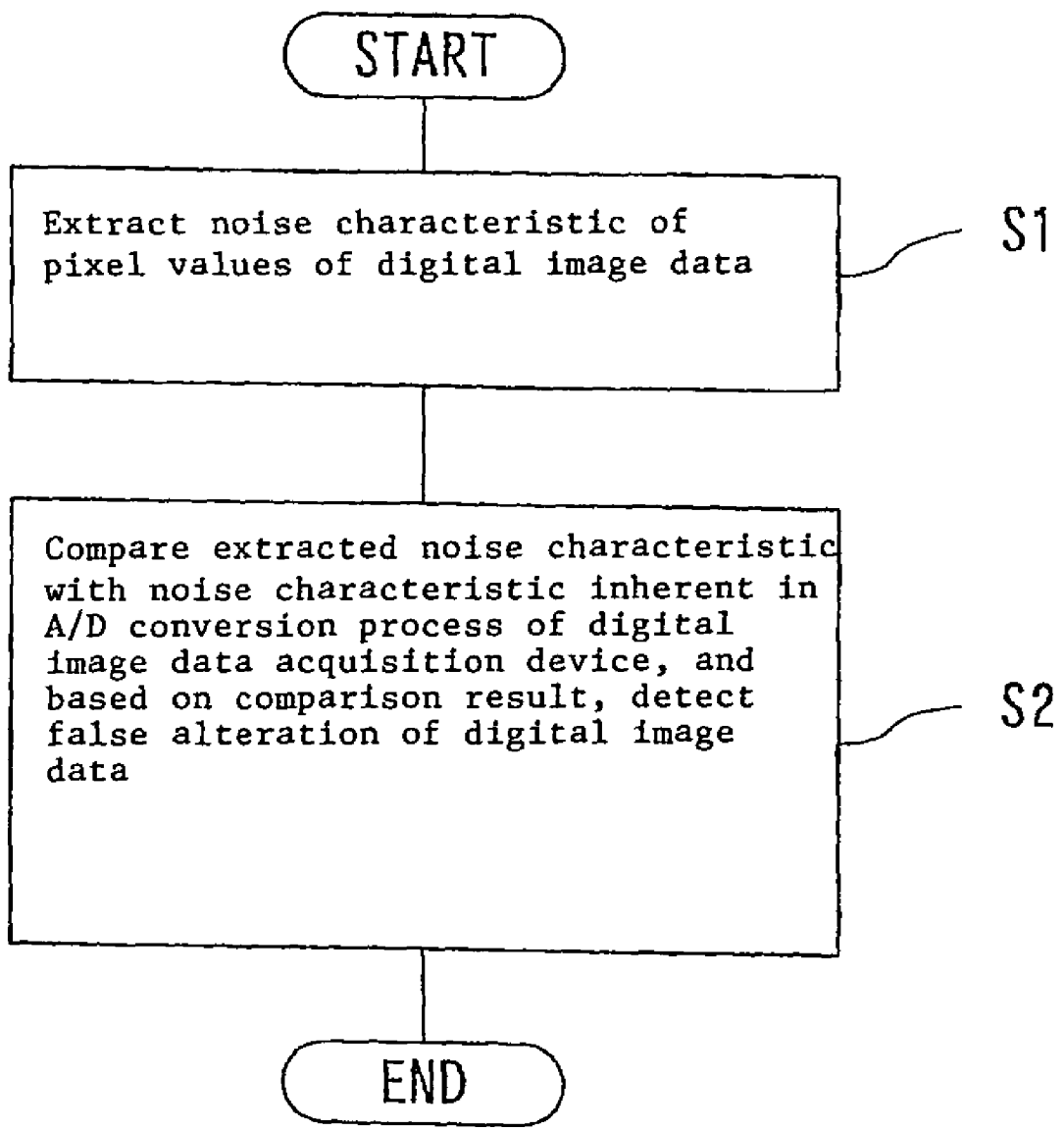
FIG. 15 is a flowchart showing a digital image data false alteration detection program according to an embodiment in the third aspect of the invention.

FIG. 15 is a flowchart of the digital image data false alteration detection program according to an embodiment in the third aspect of the invention. As shown in FIG. 15, with the digital image data false alteration detection program according to the invention, the computer first extracts the noise characteristic of the pixel value of the digital image data of which a false alteration is to be detected, acquired by the digital image data acquisition device including an analog-to-digital converter (A/D converter) (step S1 in FIG. 15). Next, the computer compares the noise characteristic extracted in step S1 with the noise characteristic inherent to the A/D conversion process in the digital image data acquisition device, and based on the result of comparison, detects a false alteration of the digital image data acquired by the digital image data acquisition device (step S2 in FIG. 15).

Figure 16:
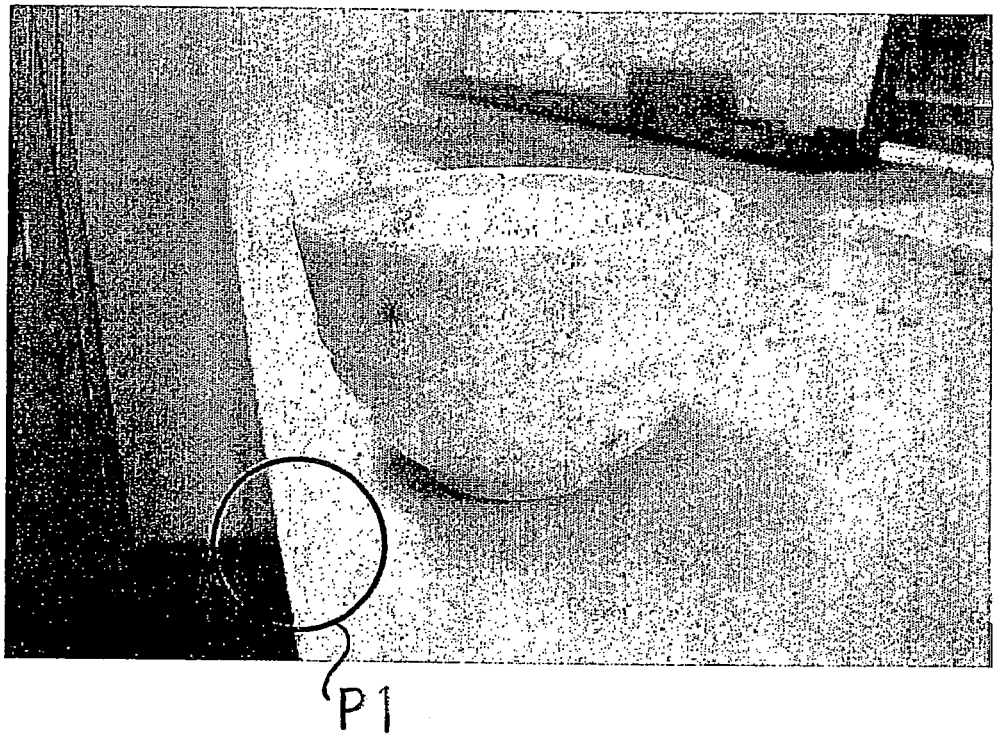
FIG. 16(A) is a diagram showing a digital image picked up by a digital camera and not falsely altered.
FIG. 16(B) is a diagram showing the image of FIG. 16(A) processed for emphasizing the fluctuation of the least significant bit of the pixel value.
Figure 16:
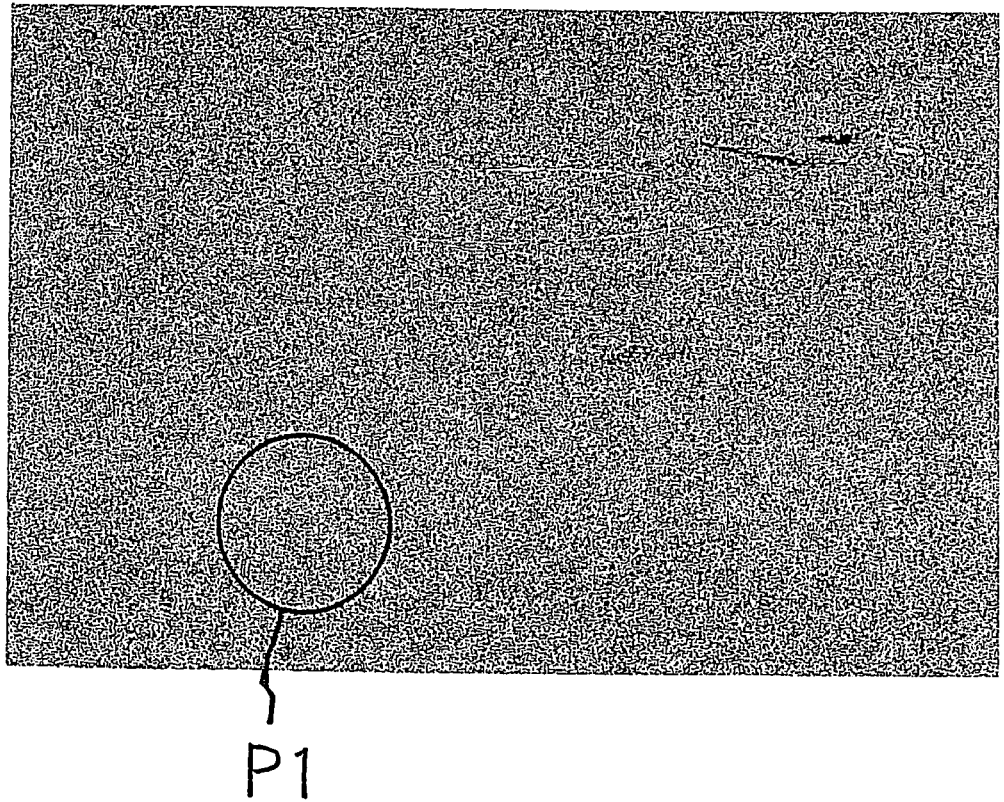
Figure 17:
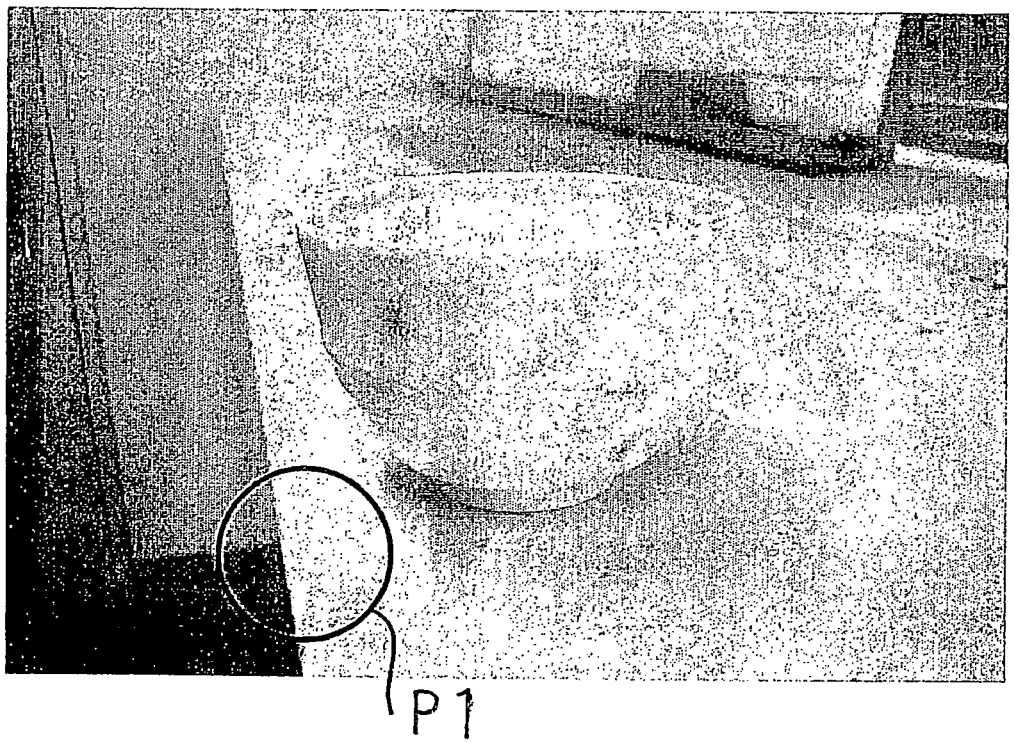
FIG. 17(A) is a diagram showing the image of FIG. 16(A) after false alteration.
FIG. 17(B) is a diagram showing the image of FIG. 17(A) processed for emphasizing the fluctuation in the same manner as in FIG. 16(A).
Figure 17:
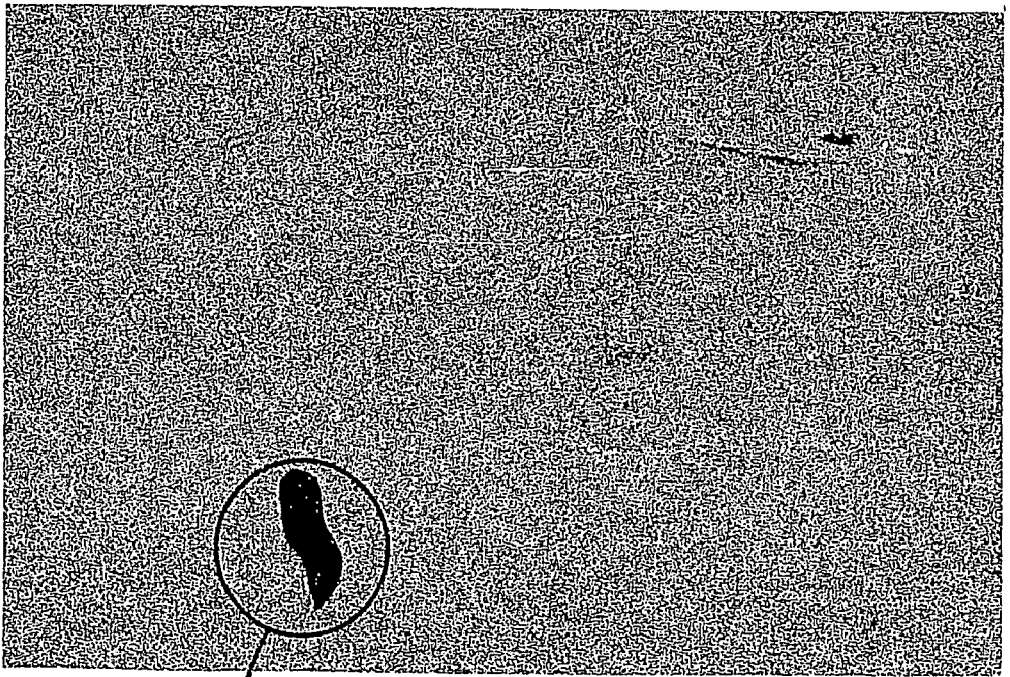

As a specific example, an explanation is given of a case in which the digital image data alteration detection program according to the invention is installed in the computer and used for the digital image actually picked up by a digital camera. In this case, the noise characteristic can be detected by checking the least significant bit of the pixel value of the digital image data. Nevertheless, it is also possible to extract the noise characteristic by other appropriate well-known methods. FIG. 16(A) shows a digital image not falsely altered, picked up by a digital camera, and FIG. 16(B) an image obtained by processing the digital image shown in FIG. 16(A) for emphasizing the fluctuation of the least significant bit of the pixel value. According to this embodiment, in the case where the least significant bit of the pixel value of the original digital image is 0, the pixel value of the particular pixel is held as it is, while in the case where the least significant bit is 1, the pixel value of the particular pixel is replaced with 255 thereby to emphasize the fluctuation. FIG. 17(A) shows an image falsely altered from the image shown in FIG. 16(A) by attaching a copy of a part of the image portion around the image portion P1 of FIG. 16(A) to a part of the image portion P1, and FIG. 17(B) the image of FIG. 17(A) processed for emphasizing the fluctuation in a similar manner to FIG. 16(A).

Due to the noise characteristic inherent to the A/D conversion process of the digital image data acquisition device, a normal digital image contains noises at random, and the distribution of the least significant bit of the pixel value is substantially random, so that the fluctuation appears at random. As shown in FIG. 16(B), therefore, after the process of emphasizing the fluctuation of the digital image not falsely altered, the image contains substantially no solidly black area. As understood from FIG. 17(B), however, once an image is falsely altered, the noise contained in the image portion falsely altered becomes uniform and the fluctuation is smoothed, thereby the falsely altered image portion is solidly blackened. In this way, the falsely altered image of FIG. 17(B) is detected by comparing FIG. 16(B) and FIG. 17(B) with each other.

Figure 18:
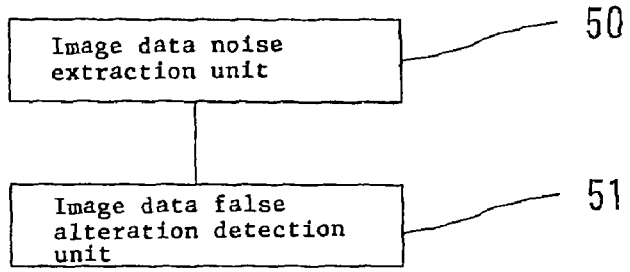
FIG. 18 is a block diagram showing a general configuration of a digital image data false alteration detection apparatus according to an embodiment in the fourth aspect of the invention.

FIG. 18 is a block diagram showing a general configuration of a digital image data false alteration detection apparatus according to an embodiment in the fourth aspect of the invention. As shown in FIG. 18, the digital image data false alteration detection apparatus according to this invention comprises a programmed computer, an image data noise characteristic extraction unit 50 for extracting the noise characteristic of the pixel value of the digital image data acquired by the digital image data acquisition device including an analog-to-digital converter (A/D converter), and an image data false alteration detection unit 51 for comparing the noise characteristic extracted by the image data noise characteristic extraction unit 50 with the noise characteristic inherent to the A/D conversion process of the digital image data acquisition device, and based on the result of comparison, detecting a false alteration of the digital image data acquired by the digital image data acquisition device.

Figure 19:
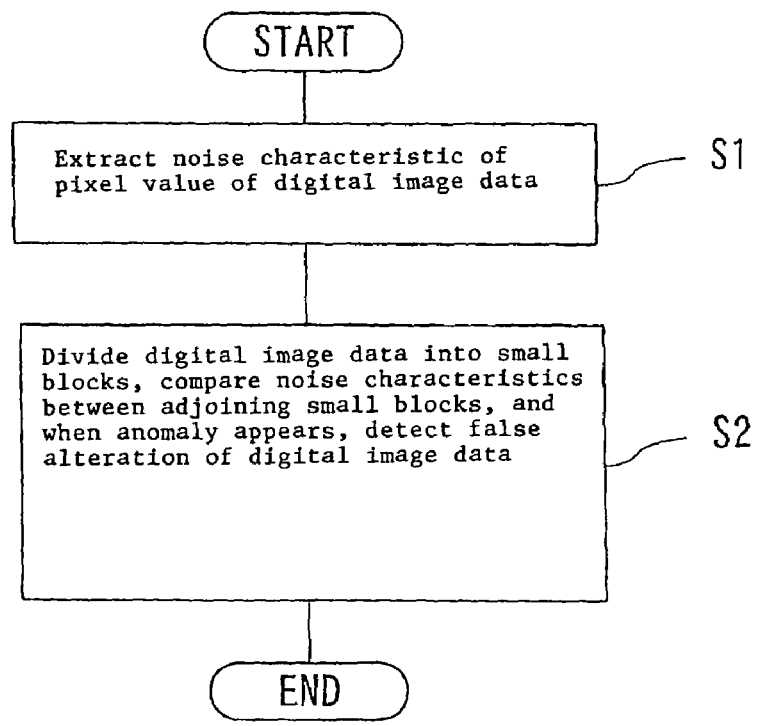
FIG. 19 is a flowchart showing a digital image data false alteration program according to an embodiment in the fifth aspect of the invention.

FIG. 19 is a flowchart of the digital image data false alteration detection program according to an embodiment in the fifth aspect of the invention. As shown in FIG. 19, with the digital image data false alteration detection program according to the invention, the computer first extracts the noise characteristic of the pixel value of the digital image data acquired by the digital image data acquisition device (step S1 in FIG. 19). Next, the computer divides the digital image data into at least two small blocks and compares the noise characteristic between adjoining small blocks, and in the case where an anomaly develops between the noise characteristics compared, detects a false alteration of the digital image data acquired by the digital image data acquisition device (step S2 in FIG. 19).

Figure 20:
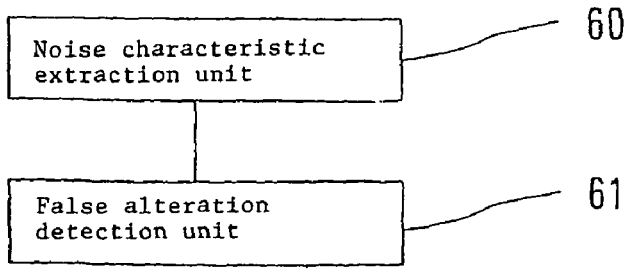
FIG. 20 is a block diagram showing a general configuration of a digital image data false alteration detection apparatus according to an embodiment in the sixth aspect of the invention.

FIG. 20 is a block diagram showing a general configuration of a digital image data false alteration detection apparatus according to an embodiment in the sixth aspect of the invention. As shown in FIG. 20, the digital image data false alteration detection apparatus according to this invention comprises a programmed computer, a noise characteristic extraction unit 60 for extracting the noise characteristic of the pixel value of the digital image data acquired by the digital image data acquisition device, and a false alteration detection unit 61 for dividing the digital image data into at least two small blocks, comparing the noise characteristics of the adjoining small blocks with each other based on the noise characteristic extracted by the noise characteristic extraction unit 60, and in the case where an anomaly appears between the compared noise characteristics, detecting a false alteration of the digital image data acquired by the digital image data acquisition device.

Figure 21:
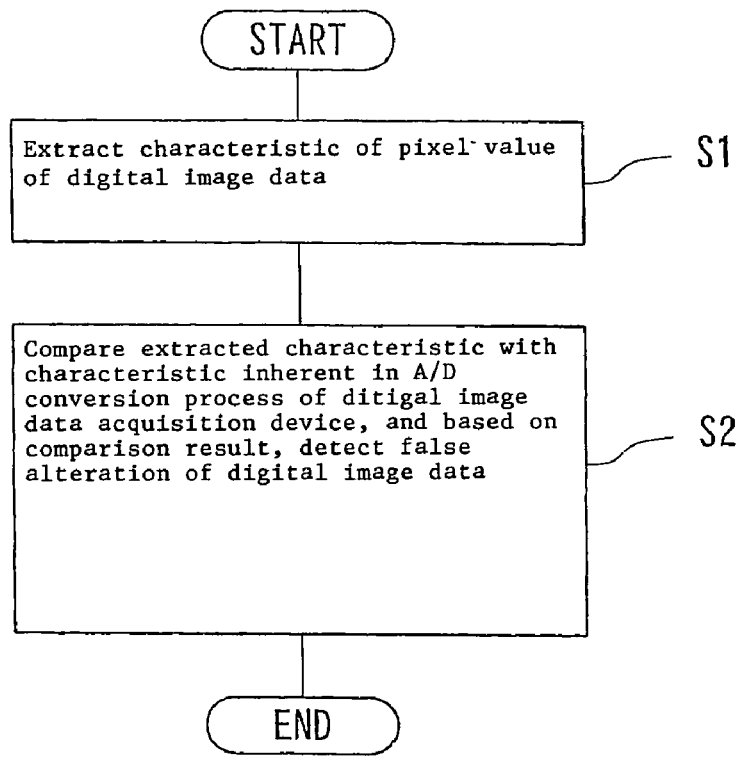
FIG. 21 is a flowchart showing a digital image data false alteration program according to an embodiment in the seventh aspect of the invention.

FIG. 21 is a flowchart of the digital image data false alteration detection program according to an embodiment in the seventh aspect of the invention. As shown in FIG. 21, with the digital image data false alteration detection program according to the invention, the computer first extracts the noise characteristic of the pixel value of the digital image data of which a false alteration is to be detected, acquired by the digital image data acquisition device including an A/D converter (step S1 in FIG. 21). Next, the computer compares the noise characteristic extracted in step S1 with the noise characteristic inherent to the pixel value of the digital image data in the A/D conversion process of the digital image data acquisition device, and based on the result of comparison, detects a false alteration of the digital image data acquired by the digital image data acquisition device (step S2 in FIG. 21).

In this case, the characteristic of the pixel value of the digital image data and the characteristic inherent to the pixel value of the digital image data in the A/D conversion process of the digital image acquisition device are various.

Figure 22:
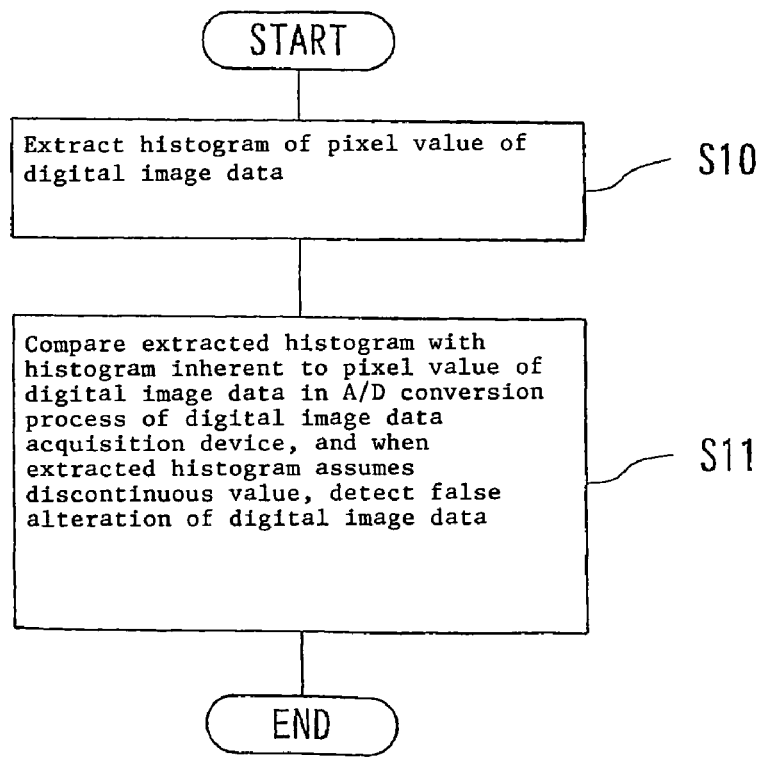
FIG. 22 is a flowchart showing a digital image data false alteration program according to another embodiment in the seventh aspect of the invention.

FIG. 22 is a flowchart of a digital image data false alteration detection program according to another embodiment in the seventh aspect of the invention. This embodiment takes into consideration a histogram as a characteristic of the pixel value of the digital image data and a characteristic of the pixel value of the digital image data in the A/D conversion process of the digital image data acquisition device. Specifically, according to this embodiment, as shown in FIG. 22, with the digital image data false alteration detection program, the computer first extracts a histogram of the pixel value of the digital image data of which a false alteration is to be detected (step S10 in FIG. 22). Next, the computer compares the extracted histogram with the histogram unique to the pixel value of the digital image data in the A/D conversion process of the digital image data acquisition device and in the case where the extracted histogram assumes a discontinuous value while the inherent histogram assumes a continuous value, detects a false alteration of the digital image data acquired by the digital image data acquisition device (step S11 in FIG. 22).

This embodiment is effective especially for detecting a false alteration by the gradation conversion process of the digital image data.

Figure 23:
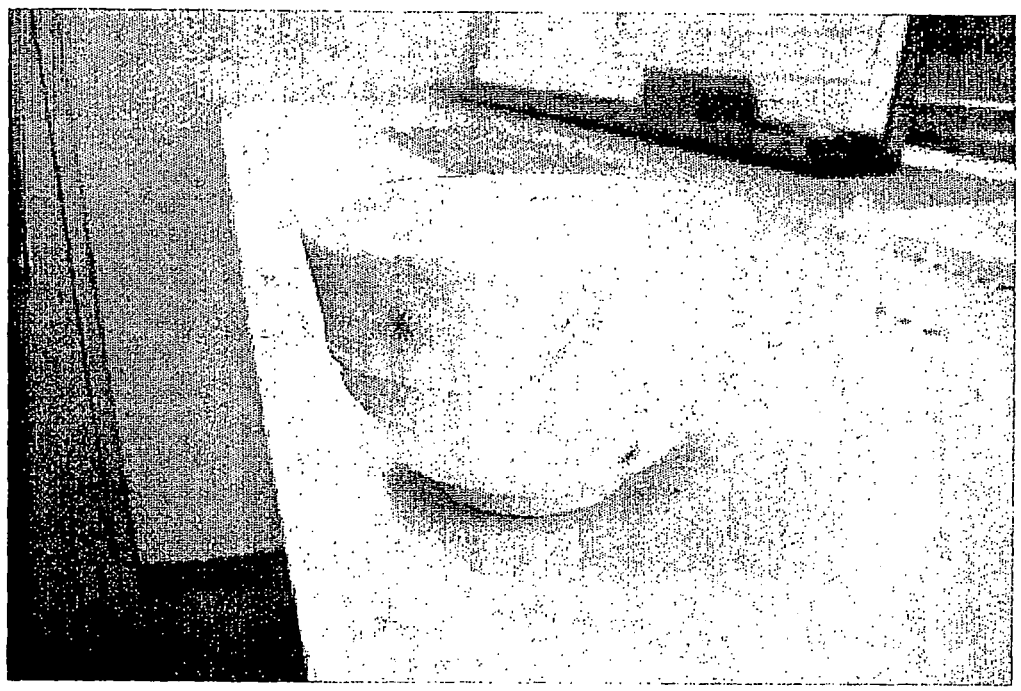
FIG. 23(A) is a diagram showing a digital image picked up by a digital camera and not falsely altered.
FIG. 23(B) is a diagram showing a histogram about the pixel values of the image shown in FIG. 23(A).
Figure 23:
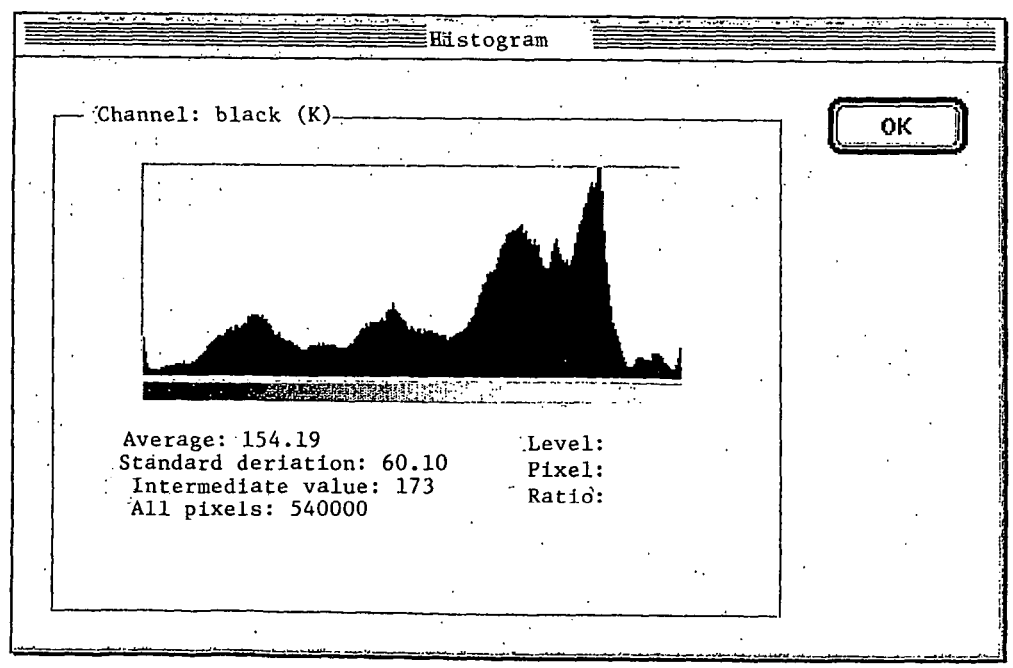
Figure 24:
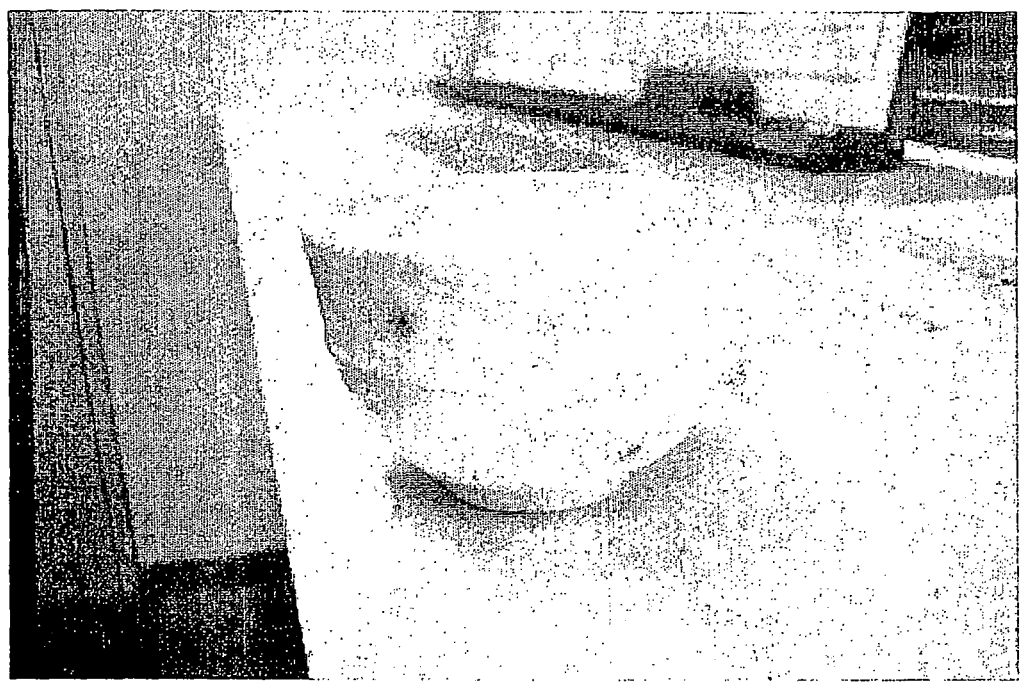
FIG. 24(A) is a diagram showing the image of FIG. 23(A) falsely altered by the gradation conversion process.
FIG. 24(B) is a diagram showing a histogram about the pixel values of the image of FIG. 24(A).
Figure 24:
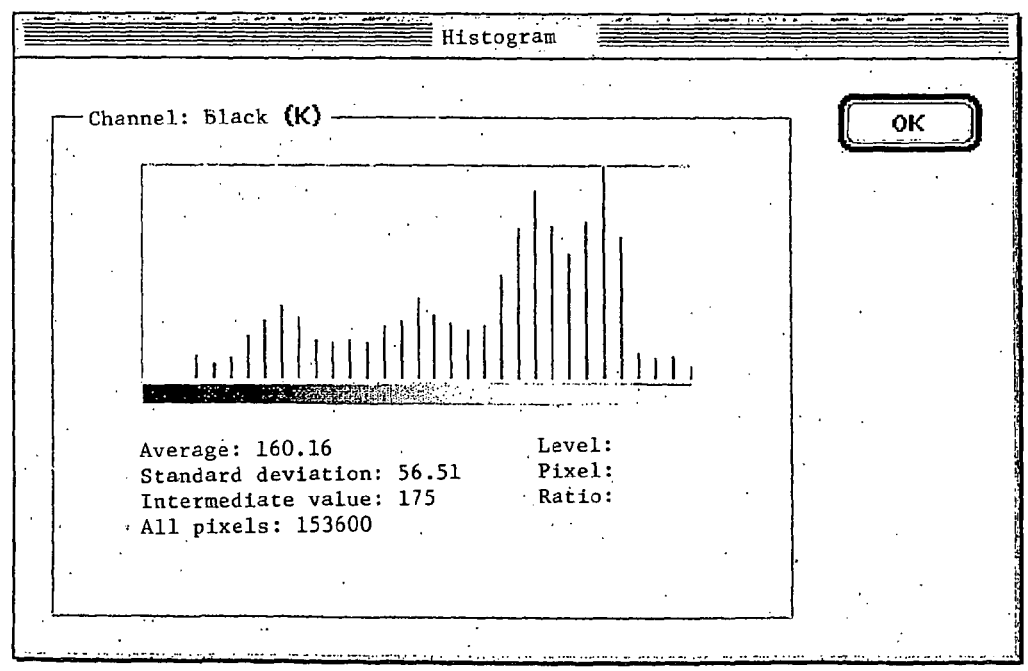

As a specific example, an explanation is given about a case in which a digital image data false alteration detection program according to this invention is installed in the computer and used for the digital image actually picked up by a digital camera. FIG. 23(A) shows an example of the digital image picked up by a digital camera and not falsely altered, and FIG. 24(A) the digital image of FIG. 23(A) falsely altered by the gradation conversion of the digital image shown in FIG. 23(A). FIG. 23(B) shows a histogram of the pixel value of the digital image shown in FIG. 23(A), and FIG. 24(B) a histogram of the pixel value of the digital image shown in FIG. 24(A). In FIGS. 23(B) and 24(B), the abscissa of the graph represents the gradation value and the ordinate the frequency.

As shown in FIG. 23(B), the histogram inherent to the pixel value of the digital image data in the A/D conversion process of the digital image acquisition device assumes a continuous value. Once the digital image data acquired by the digital image acquisition device is falsely altered, on the other hand, the histogram of the pixel value of the particular image data assumes a discontinuous value as shown in FIG. 24(B). In the case where the histogram assumes a discontinuous value, therefore, a false alteration of the digital image data can be detected.

This example concerns the case of a digital image in gray scale. As an alternative, a false alteration of a RGB digital image can also be detected in a manner similar to the gray scale image by producing a histogram for each channel of R, G, B.

Figure 25:
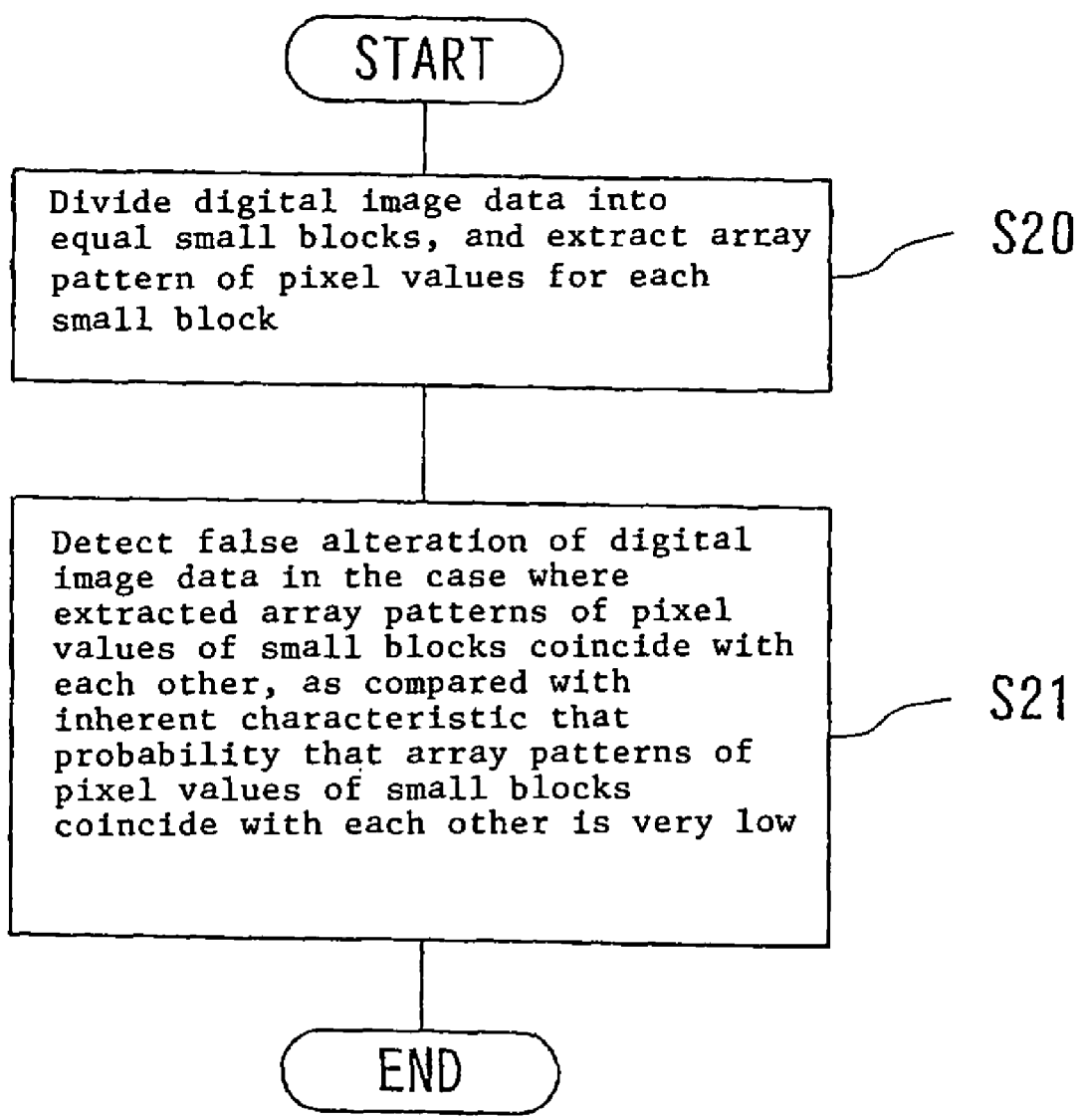
FIG. 25 is a flowchart showing a digital image data false alteration detection program according to still another embodiment in the seventh aspect of the invention.

FIG. 25 is a flowchart for a digital image data false alteration detection program according to still another embodiment in the seventh aspect of the invention. According to this embodiment, the array pattern of the pixel values for each of the small blocks into which the digital image data with a false alteration thereof to be detected is divided is considered as a characteristic of the pixel value of the digital image data, and compared with the characteristic inherent to the digital image data acquisition device. Specifically, in this embodiment, with the digital image data false alteration detection program according to the invention, as shown in FIG. 25, the computer first divides the digital image data of which a false alteration is to be detected, into at least two or more small equal blocks, and extracts an array pattern of the pixel values for each small block (step S20 in FIG. 25). Next, the computer detects a false alteration of the digital image data in the case where the array patterns of the pixel values of the small blocks extracted in step S20 coincide with each other in spite of the characteristic fact of the pixel value of the digital image data in the A/D conversion process of the digital image data acquisition device to the effect that the probability is very low that the array patterns of the pixel values of the small blocks coincide with each other (step S21 in FIG. 25).

This embodiment is effective especially for detecting a false alteration of the digital image data by stamping.

Figure 26:
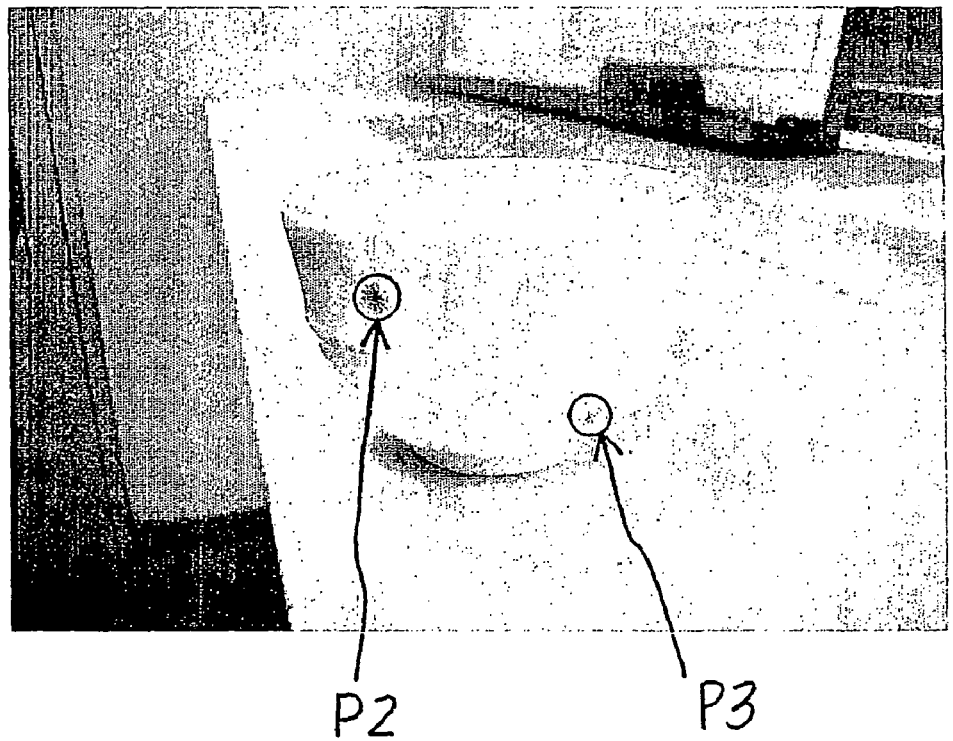
FIG. 26(A) is a diagram showing a digital image picked up by a digital camera and not falsely altered.
FIG. 26(B) is a diagram showing an image falsely altered by stamping the image of FIG. 26(A).
Figure 26:
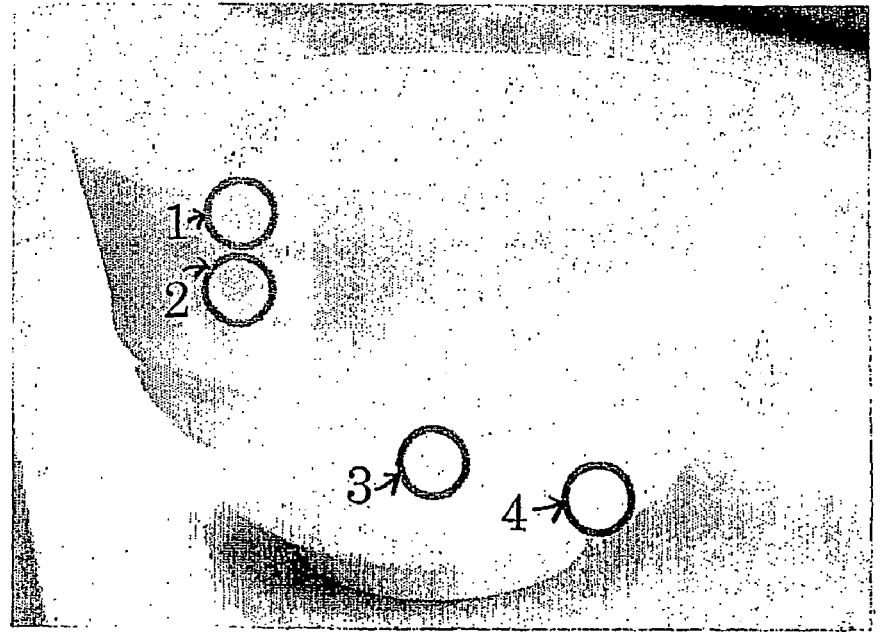

As a specific example, an explanation is given about a case in which the digital image data false alteration detection program according to the invention is installed in the computer and used for the digital image actually picked up by a digital camera. FIG. 26(A) shows an example of the digital image picked up by a digital camera and not falsely altered, and FIG. 26(B) an image falsely altered by stamping from the image shown in FIG. 26(A). In the stamping process, as shown in the image of FIG. 26(B), an image portion 1 configured of 3 by 3 pixels is copied and attached to an image portion 2 (corresponding to the image portion P2 in FIG. 26(A)) configured of 3 by 3 pixels. Similarly, an image portion 3 configured of 3 by 3 pixels is copied and attached to an image pixel portion 4 (corresponding to the image portion P3 in FIG. 26(A)) configured of 3 by 3 pixels.

FIGS. 27(A) to (D) show array patterns of the pixel values of the image portions 1 to 4 extracted from the equal small blocks of 3 by 3 pixels into which the digital image is divided. As understood from FIG. 27, the array patterns of the pixel values coincide between the image portion 1 (FIG. 27(A)) and the image portion 2 (FIG. 27(B)), and the array patterns of the pixel values coincide between the image portion 3 (FIG. 27(C)) and the image portion 4 (FIG. 27(D)). As a result, a false alteration of the digital image data can be detected which has been carried out by executing the stamping process between the image portions 1 and 2 on the one hand, and between the image portions 3 and 4 on the other hand.

This example represents a case concerning the gray scale digital image. Nevertheless, a false alteration of a RGB digital image can also be detected in a manner similar to the gray scale image by extracting the array pattern of the pixel values for each channel of R, G, B in small blocks.

Figure 28:
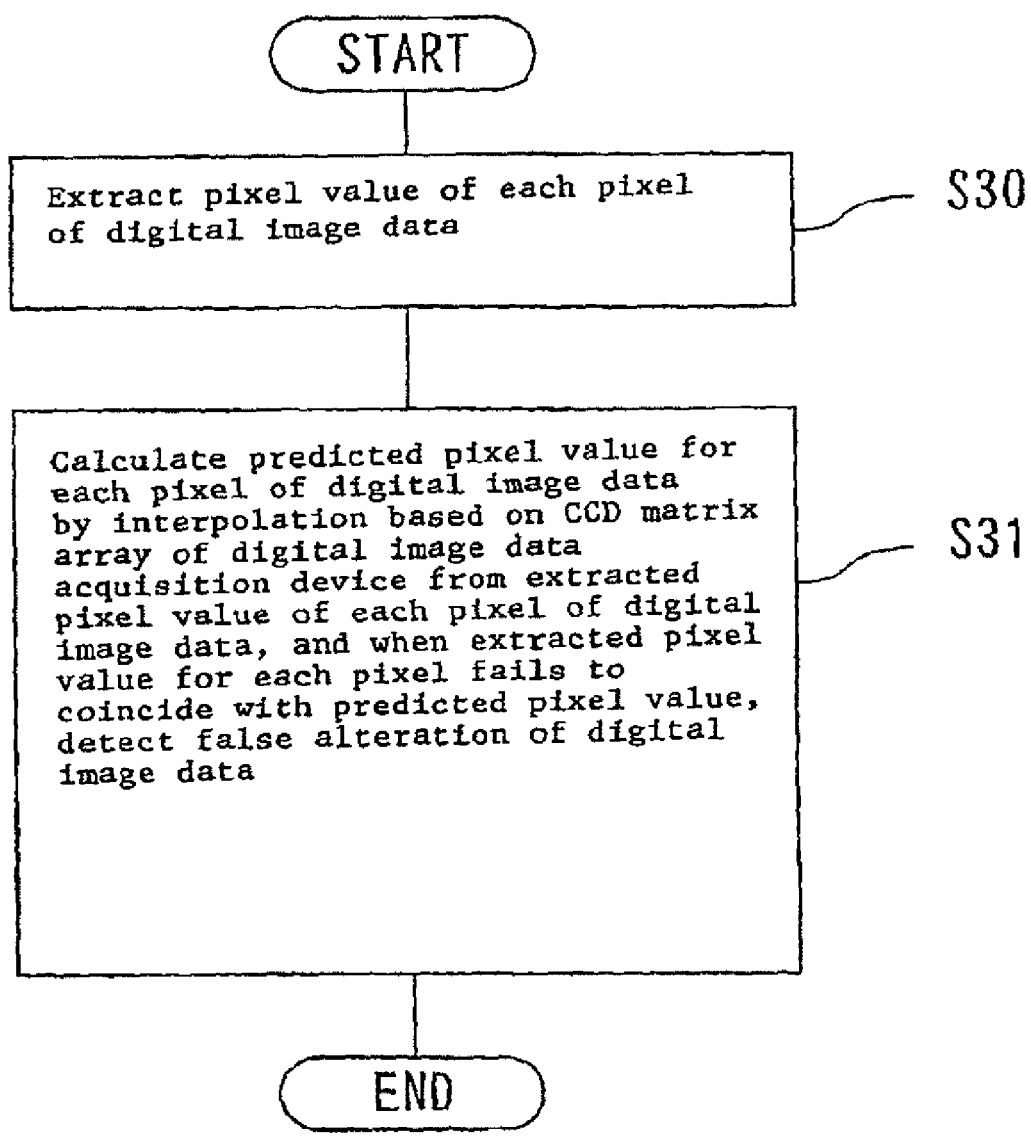
FIG. 28 is a flowchart showing a digital image data false alteration detection program according to yet another embodiment in the seventh aspect of the invention.

FIG. 28 is a flowchart for a digital image data false alteration detection program according to yet another embodiment in the seventh aspect of the invention. This embodiment is applicable to a digital image data acquisition device having a CCD such as a digital camera or an image scanner. As shown in FIG. 28, with the digital image data false alteration detection program according to this invention, the computer first extracts the pixel value of each pixel of the digital image of which a false alteration is to be detected, acquired by the digital image acquisition device including an A/D converter (step S30 in FIG. 28).

Next, the computer calculates a predicted pixel value of each pixel of the digital image data by the interpolation calculation based on the array of the CCD matrix of the digital image data acquisition device from the pixel value of each pixel of the digital image data extracted in step S30, and in the case where the pixel value of a given pixel extracted in step S30 fails to coincide with a corresponding predicted pixel value, detects a false alteration of the digital image data (step S31 in FIG. 28). Step S31 is explained in detail below.

A digital camera, an image scanner, etc. having a CCD, as shown in FIG. 29, normally comprises a CCD matrix of CCD devices 100 to 102 having R (red), G (green) and B (blue) filters, respectively, arranged in a predetermined pattern. The CCD devices 100 to 102 of the CCD matrix each correspond to a pixel of the digital image. In this state, however, each pixel has a pixel value of only one channel of R, G or B (a pixel corresponding to the CCD device having the R filter, for example, has only a R value), and therefore, an appropriate digital image cannot be retrieved. In view of this, pixel values of non-existent channels (the values of G and B for the pixel corresponding to the CCD device having the R filter, for example) are calculated by interpolation for each CCD device from the surrounding pixel values of the same channel. Several methods are available for interpolation calculation. Assuming that the averaging method is employed in this case, the interpolation calculation is carried out in the following manner.

Specifically, assume that the interpolation calculation is carried out for the portion 200 including 4 by 4 CCD devices in the CCD matrix shown in FIG. 29, and that each CCD device of the portion 200 has detected a pixel value shown in FIG. 30(A). Incidentally, FIG. 30(B) is a list of the numbers attached to the CCD devices of the portion 200 to facilitate explanation.

The pixel values of the pixels corresponding to the CCD devices 6, 7, 10 and 11 shown in FIG. 30(B) are determined by interpolation calculation in the following manner:

(1) Pixels Corresponding to the CCD Device 6

The R value is determined by averaging the R values of the CCD devices 1, 3, 9 and 11. Specifically, R=(0+0+0+255)/4=63.75. The G value, on the other hand, is determined by averaging the G values of the pixels 2, 5, 7 and 10. Specifically G=(0+0+255+255)/4=127.5. The B value remains as it is, that is, B=0.

(2) Pixels Corresponding to the CCD Device 7

The R value is determined by averaging the R values of the CCD devices 3 and 11. Specifically, R=(0+255)/2=127.5. The G value remains as it is, that is, G=0. The B value, on the other hand, is determined by averaging the B values of the CCD devices 6 and 8. Specifically B=(0+255)/2=127.5.

(3) Pixels Corresponding to the CCD Device 10

The R value is determined by averaging the R values of the CCD devices 9 and 11. Specifically, R=(0+255)/2=127.5. The G value remains as it is, that is, G=0. The B value, on the other hand, is determined by averaging the B values of the CCD devices 6 and 14. Specifically B=(0+255)/2=127.5.

(4) Pixels Corresponding to the CCD Device 11

The R value remains as it is, that is, R=0. The G value is determined by averaging the G values of the CCD devices 7, 10, 12 and 15. Specifically, (255+255+0+0)/4=127.5. The B value, on the other hand, is determined by averaging the B values of the CCD devices 6, 8, 14 and 16. Specifically, (0+255+255+0)/4=127.5.

This interpolation calculation is carried out for all the CCD devices making up the portion 200 thereby to determine the pixel value of each pixel of a corresponding digital image as shown in FIG. 31(A).

In this case, the pixel value of the filter of the CCD device is not changed by the interpolation calculation. As long as the arrangement of the CCD matrix and the method of interpolation calculation are known in advance, therefore, the pixel value (predicted pixel value) that a given digital image data should originally hold can be calculated from the pixel value of the particular digital image data. Unless the digital image data is falsely altered, the original pixel value and the predicted pixel value of the digital image data naturally coincide with each other. In the case where the original pixel value and the predicted pixel value fail to coincide with each other, therefore, a false alteration of the image data is detected.

This embodiment is effective for detecting a false alteration of the digital image data committed by any of various well-known false alteration methods.

As a specific example, an explanation is given below about a case in which the digital image data false alteration detection program according to this invention is installed in a computer and used for a digital image actually picked up by a digital camera.

The digital camera is assumed to have the CCD matrix shown in FIG. 29. FIG. 31(B) shows the pixel values extracted from the image falsely altered by the Gaussian shading process executed on the image shown in FIG. 31(A). FIG. 32(A) shows the pixel values assumed to have been detected from the pixel values of FIG. 31(B) by the corresponding CCD devices. FIG. 32(B) shows the predicted pixel values calculated from the pixel values of FIG. 32(A). The pixel values of FIG. 31(B) fail to coincide with the predicted pixel values of FIG. 32(B), and therefore a false alteration of the digital image is detected.

Figure 33:
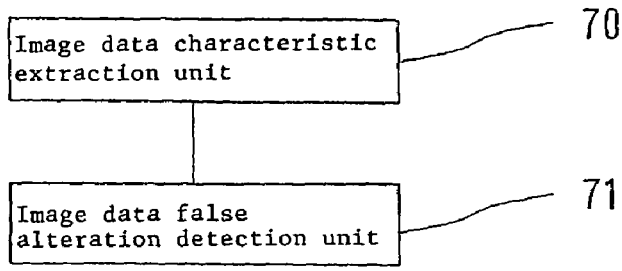
FIG. 33 is a block diagram showing a general configuration of a digital image data false alteration detection apparatus according to an embodiment in the eighth aspect of the invention.

FIG. 33 is a block diagram showing a general configuration of a digital image data false alteration detection apparatus according to an embodiment in the eighth aspect of the invention. The digital image data false alteration detection apparatus according to this invention comprises a programmed computer, an image data characteristic extraction unit 70 for extracting the characteristic of the pixel values of the digital image data acquired by the digital image acquisition device including an A/D converter, and an image data false alteration detection unit 71 for comparing the characteristic extracted by the image data characteristic extraction unit 70 with the characteristic inherent to the pixel values of the digital image data in the A/D conversion process of the digital image data acquisition device, and based on the result of comparison, detecting a false alteration of the digital image data.

According to another embodiment in the eighth aspect of the invention, the image data characteristic extraction unit 70 extracts a histogram of the pixel values of the digital image data. The image data false alteration detection unit 71 compares the histogram extracted by the image data characteristic extraction unit 70 with the histogram inherent to the pixel values of the digital image data in the A/D conversion process of the digital image data acquisition device, and in the case where the inherent histogram assumes a continuous value while the histogram extracted by the image data characteristic extraction unit 70 assumes a discontinuous value, detects a false alteration of the digital image data acquired by the digital image data acquisition device.

According to still another embodiment in the eighth aspect of the invention, the image data characteristic extraction unit 70 divides the digital image data into at least two or more equal small blocks and extracts the array pattern of the pixel values for each small block. The image data false alteration detection unit 71, on the other hand, detects a false alteration of the digital image data in the case where the array patterns of the pixel values of the small blocks extracted by the image data characteristic extraction unit 70 coincide with each other, as compared with the unique characteristic that the probability is very low that the array patterns of the pixel values of the small blocks coincide with each other.

Yet another embodiment in the eighth aspect of the invention is suitable for detecting a false alteration of the digital image acquired by a digital image data acquisition device having a CCD such as a digital camera or an image scanner. According to this embodiment, the image data characteristic extraction unit 70 extracts the pixel value of each pixel of the digital image data. The image data false alteration detection unit 71, on the other hand, calculates a predicted pixel value for each pixel of the digital image data by the interpolation calculation based on the CCD matrix array of the digital image data acquisition device from the pixel value of each pixel of the digital image data extracted by the image data characteristic extraction unit 70, and in the case where the pixel value of each pixel extracted by the image data characteristic extraction unit 70 fails to coincide with a corresponding predicted pixel value, a false alteration of the digital image data is detected.

Figure 34:
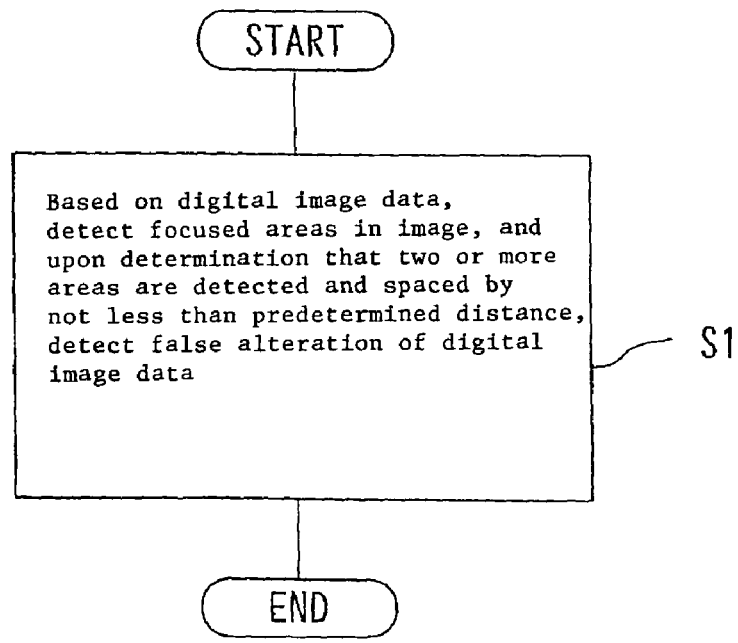
FIG. 34 is a flowchart showing a digital image data false alteration detection program according to an embodiment in the ninth aspect of the invention.

FIG. 34 is a flowchart for a digital image data false alteration detection program according to an embodiment in the ninth aspect of the invention. As shown in FIG. 34, with the digital image data false alteration detection program according to this invention, a computer detects focused areas in the image based on the digital image data acquired by the digital image data acquisition device, and upon determination that two or more detected areas exist and spaced from each other by a predetermined distance, detects a false alteration of the digital image data (step S1 in FIG. 34).

This embodiment is effective especially for detecting a false alteration of the digital image committed by the image synthesis process.

Figure 35:
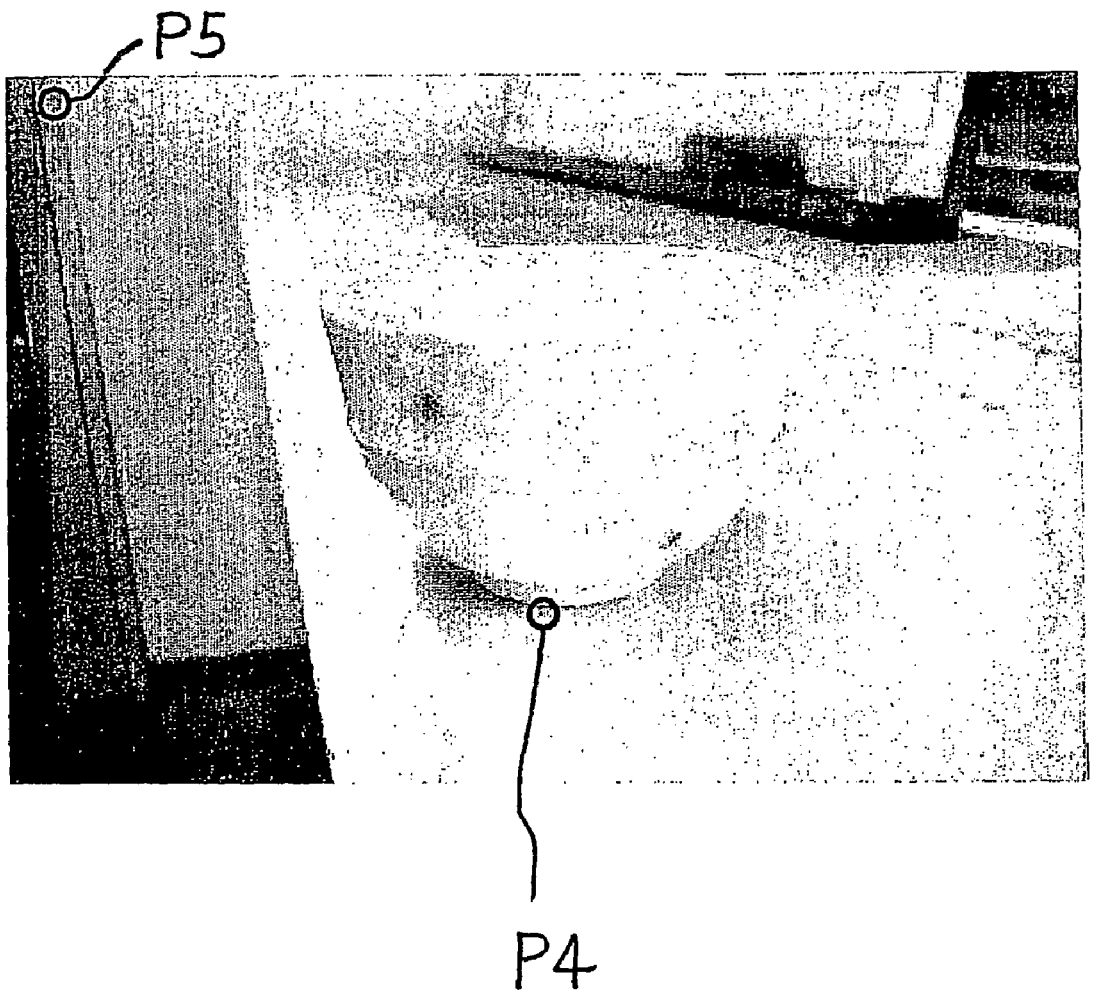
FIG. 35 is a diagram showing a digital image picked up by a digital camera and not falsely altered.
Figure 36:
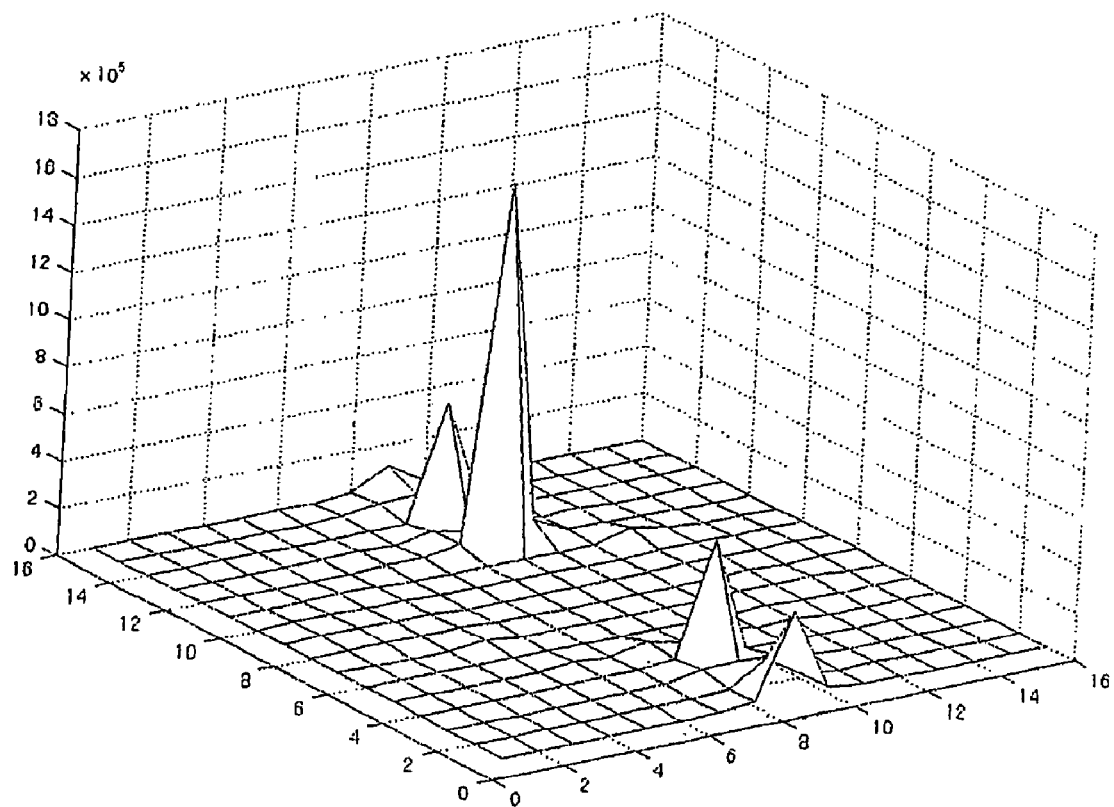
FIG. 36 is a graph showing the frequency characteristic obtained using HPF by performing FFT of 16×16 pixels extracted from the focused area P4 in the image shown in FIG. 35.
Figure 37:
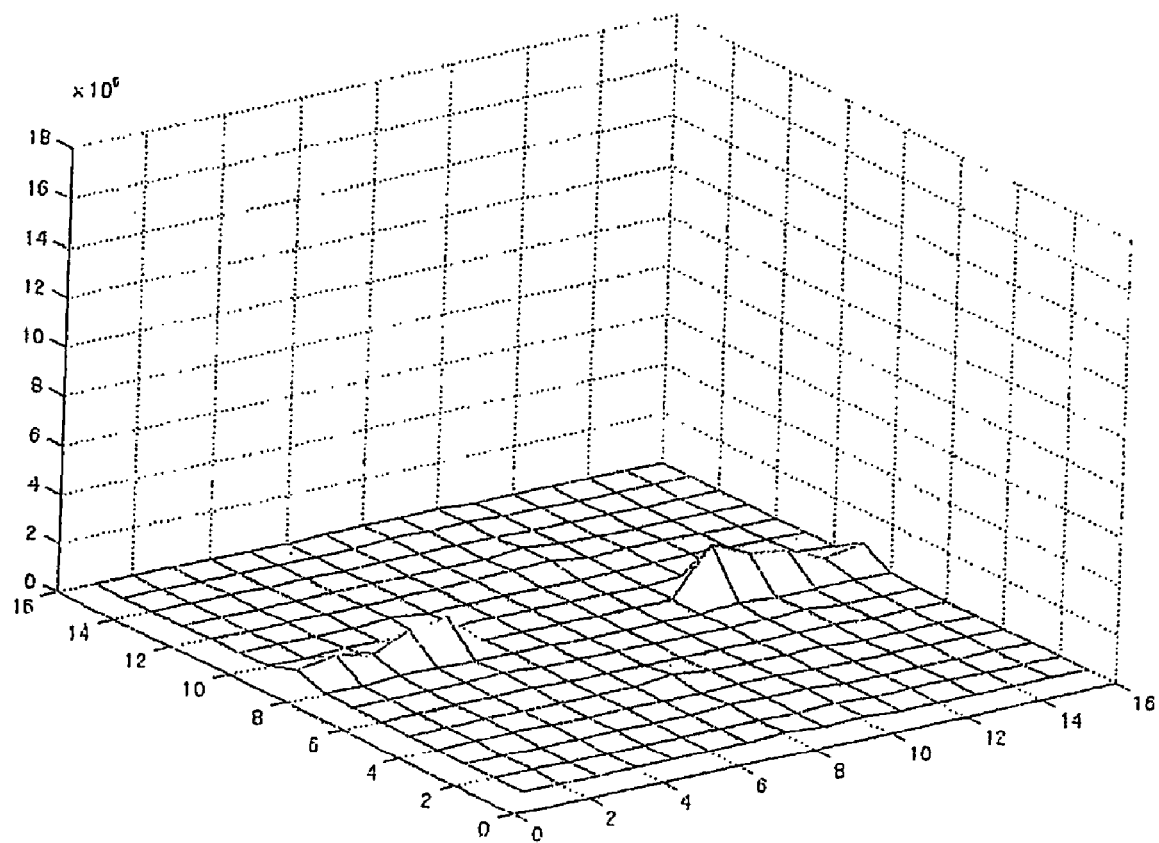
FIG. 37 is a graph showing the frequency characteristic obtained by the process similar to that for the area P4 by extracting 16×16 pixels from the unfocused area P5 making up the background of the image shown in FIG. 35.

As a specific example, an explanation is given below about a case in which the digital image data false alteration detection program according to this invention is installed in a computer and used for a digital image actually picked up by a digital camera. FIG. 35 shows a digital image picked up by a digital camera and not falsely altered. FIG. 36 is a graph showing the frequency characteristic obtained by extracting and subjecting to FFT (fast Fourier transform) 16 by 16 pixels in the focused area P4 in the image shown in FIG. 35 and using a HPF (high-pass filter). FIG. 37 is a graph showing the frequency characteristic obtained by extracting 16 by 16 pixels in the unfocused area P5 constituting the background in the image shown in FIG. 35 and processing them in similar manner to the area P4. Comparison between FIG. 36 and FIG. 37 shows that the spectrum of the high-frequency domain in the focused area is very strong.

Figure 38:
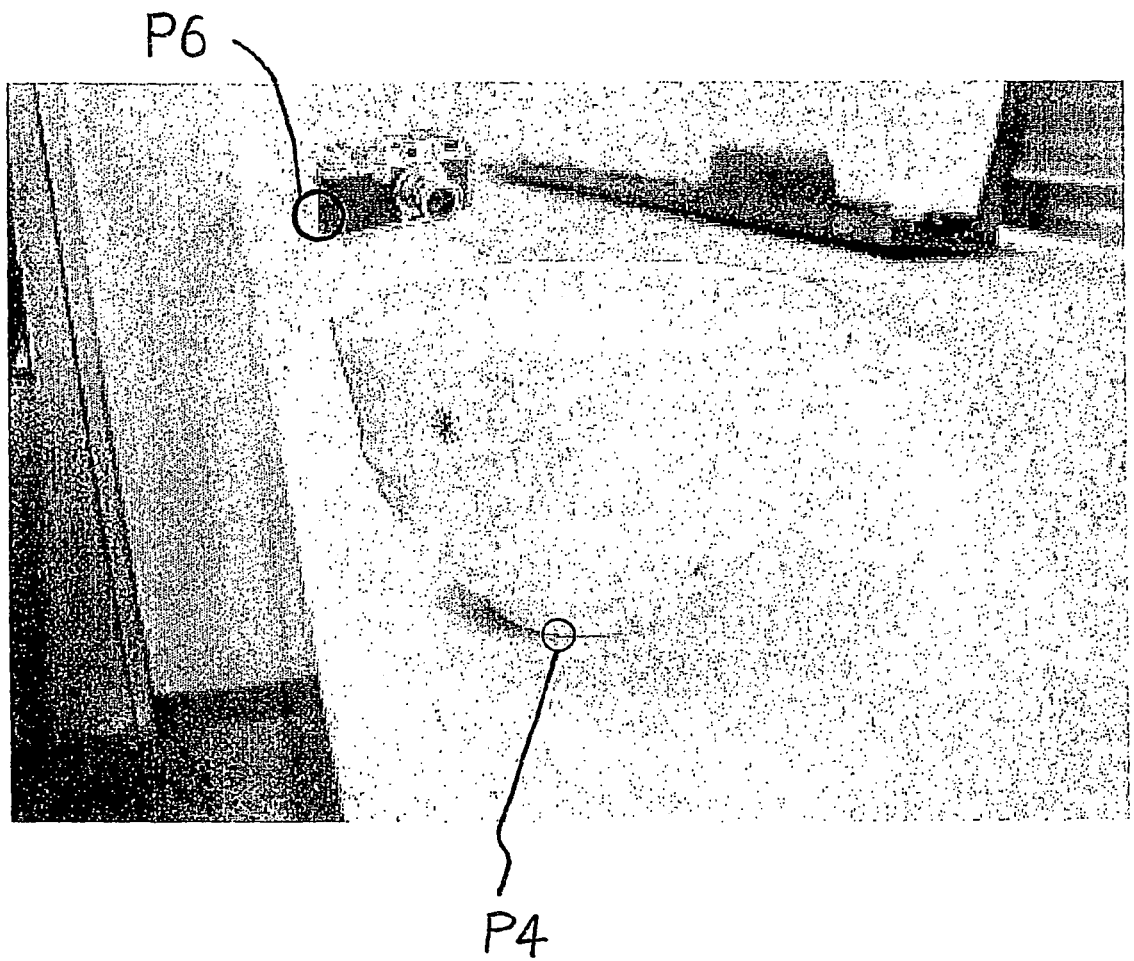
FIG. 38 is a diagram showing the image of FIG. 35 falsely altered by synthesis with another image.
Figure 39:
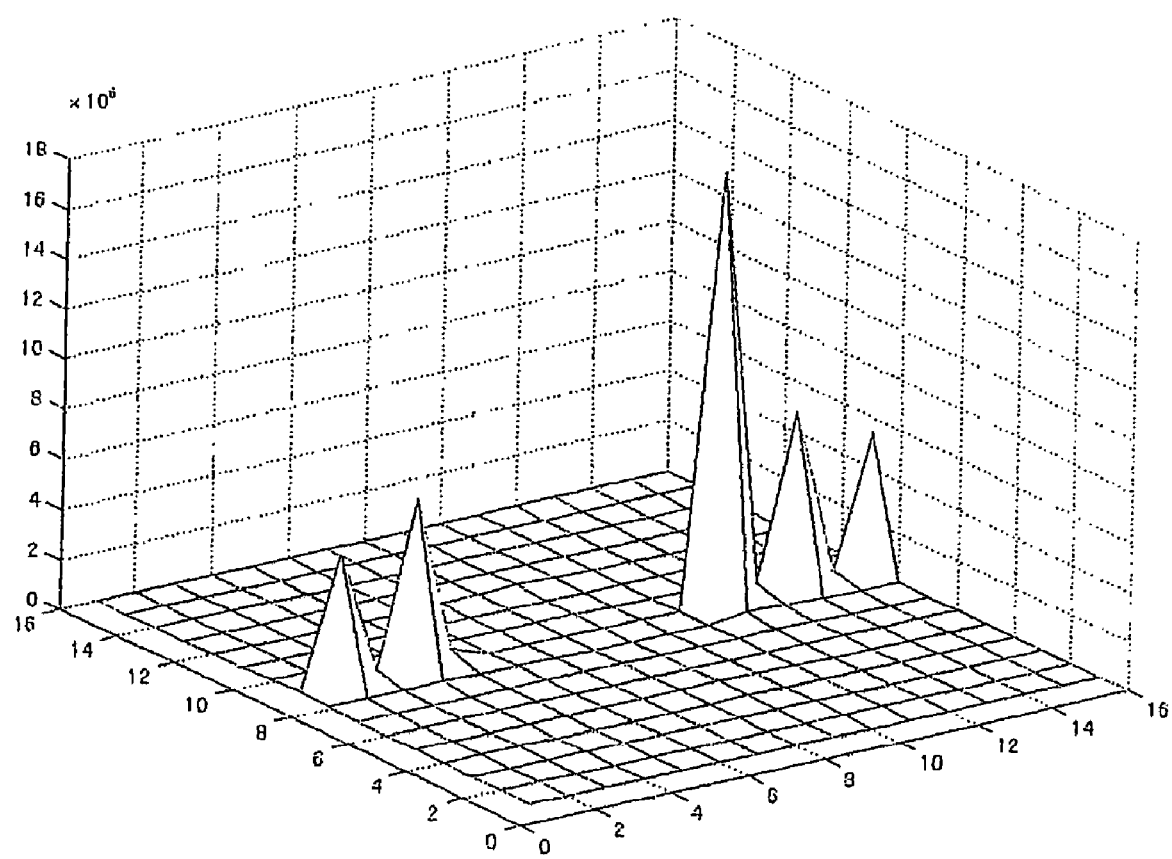
FIG. 39 is a graph showing the frequency characteristic obtained by a similar process to that for the area P4 of FIG. 35 by extracting 16×16 pixels from the area P6 of another image synthesized in the image shown in FIG. 38.

FIG. 38 shows an image falsely altered by the process of synthesizing the image shown in FIG. 35 with another image. FIG. 39 is a graph showing the frequency characteristic obtained by extracting 16 by 16 pixels in the area P6 of another image synthesized with the image shown in FIG. 38 and processing them in a similar manner to the area P4 shown in FIG. 35. FIG. 39 indicates that the area P6 also has a very strong spectrum of high-frequency domain and the image is focused. In the image shown in FIG. 38, therefore, two focused areas (areas P4 and P6) are spaced from each other by a predetermined distance, thereby indicating that the image is synthesized. Thus, a false alteration is detected.

Figure 40:
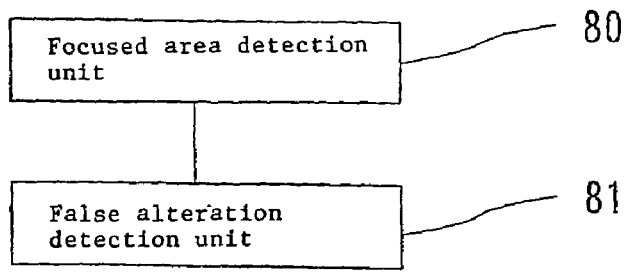
FIG. 40 is a block diagram showing a general configuration of a digital image data false alteration detection apparatus according an embodiment in the tenth aspect of the invention.

FIG. 40 is a block diagram showing a general configuration of a digital image data false alteration detection apparatus according to an embodiment in the tenth aspect of the invention. The digital image data false alteration detection apparatus according to this invention comprises a programmed computer, and as shown in FIG. 40, further comprises a focused area detection unit 80 for detecting a focused area in an image based on the digital image data acquired by the digital image data acquisition device and a false alteration detection unit 81 for detecting a false alteration of the digital image data in the case where the existence of a plurality of focused areas spaced from each other by a predetermined distance is determined from the positions of the particular areas in the image detected by the focused area detection unit 80.

INDUSTRIAL APPLICABILITY

As described above, according to this invention, the presence or absence of a data alteration is detected by utilizing the characteristic inherent to the analog-to-digital conversion process of the digital data acquisition device. Even in an open system, therefore, a false data alteration can be positively detected. Also, the need of a device for burying the data in advance or extracting the data buried is eliminated. Thus, this invention greatly contributes to overcoming the problem of false alteration of the digital data which is expected to be posed by the future development of the IT technology.

The invention claimed is:

1. A digital data false alteration detection program for causing a computer to detect the false alteration of the digital data acquired by a digital data acquisition device including a light detector or a sound detector and an A/D converter, characterized in that said computer is caused to execute:
   (a) a step of dividing said digital data into at least two smaller block data,
   (b) a step of extracting noises inherent to said digital data acquisition device for each of said small block data,
   (c) a step of calculating the correlation of said noises between adjacent ones of said small block data, and
   (d) a step of detecting small block data having a noise correlation lower than a level predetermined for the surrounding small block data, as a falsely altered data.

2. The digital data false alteration detection program according to claim 1, characterized in that said step (b) includes a step of converting each of said small block data into a frequency domain and extracting the high-frequency component of said each small block data as a noise inherent to said digital data acquisition device.

3. The digital data false alteration detection program according to claim 1, characterized in that said step (b) includes a step of converting each of the small block data into a frequency domain and extracting a specific high-frequency component of said each small block data as a noise inherent to said digital data acquisition device.

4. The digital data false alteration detection program according to claim 1, characterized in that said step (c) includes a step of calculating an accumulated value of said noise for said each of the small block data and calculating the correlation of said noise from the difference of the accumulated value of said noise between adjacent ones of said small block data.

5. A digital data false alteration detection apparatus for detecting a false alteration of the digital data acquired by a digital data acquisition device including a light detector or a sound detector and an A/D converter, comprising:
   a data divider for dividing said digital data into at least two small block data;
   a noise extraction unit for extracting a noise inherent to said digital data acquisition device for each of said small block data; and
   a false alteration detection unit for calculating the correlation of said noise between adjacent ones of said small block data and detecting the small block data with said noise correlation lower than a level predetermined for the surrounding small block data, as a false data.

6. The digital data false alteration detection apparatus according to claim 5, characterized in that said noise extraction unit converts each of said small block data into a frequency domain and extracting the high-frequency component of said each small block data as a noise inherent to said digital data acquisition device.

7. The digital data false alteration detection apparatus according to claim 5, characterized in that said noise extraction unit converts each of said small block data into a frequency domain and extracting a specific high-frequency component of said each small block data as a noise inherent to said digital data acquisition device.

8. The digital data false alteration detection apparatus according to claim 5, characterized in that said data divider is adapted to divide said small block data into data of an arbitrary size.

9. The digital data false alteration detection apparatus according to claim 5, characterized in that said false alteration detection unit calculates an accumulated value of said noise for each of said small block data and calculating the correlation of said noise from the difference of the accumulated value of said noise between adjacent ones of said small block data.

10. The digital data false alteration detection apparatus according to claim 5, characterized in that said data divider is adapted to divide said digital data at an arbitrary position.

11. A digital image data false alteration detection program for causing a computer to detect a false alteration of the digital image data acquired by a digital image data acquisition device including an A/D converter, characterized in that said computer is caused to execute:
    (a) a step of extracting the noise of the pixel value of said digital image data; and
    (b) a step of comparing said extracted noise characteristic with the noise characteristic inherent to the A/D conversion process of said digital image data acquisition device, and based on the result of comparison, detecting a false alteration of the digital image data acquired by said digital image data acquisition device.

12. A digital image data false alteration detection apparatus for detecting a false alteration of the digital image data acquired by a digital image data acquisition device including an A/D converter, comprising:
    an image data noise characteristic extraction unit for extracting the noise characteristic of the pixel value of said digital image data; and
    an image data false alteration detection unit for comparing the noise characteristic extracted by said image data noise characteristic extraction unit with the noise characteristic inherent to the A/D conversion process of said digital image data acquisition device and based on the result of comparison, detecting a false alteration of the digital image data acquired by said digital image data acquisition device.

13. A digital image data false alteration detection program for causing a computer to detect a false alteration of the digital image data acquired by said digital image data acquisition device including an A/D converter, characterized in that said computer is caused to execute:
    (a) a step of extracting the noise characteristic of the pixel value of said digital image data; and
    (b) a step of dividing said digital image data into at least two small blocks, comparing the noise characteristics between adjacent ones of said small blocks and upon development of an anomaly between the compared noise characteristics, detecting a false alteration of the digital image data acquired by said digital image data acquisition device.

14. A digital image data false alteration detection apparatus for detecting a false alteration of the digital image data acquired by a digital image data acquisition device including an A/D converter, comprising:
- a noise characteristic extraction unit for extracting the noise characteristic of the pixel value of said digital image data; and
- a false alteration detection unit for dividing said digital image data into at least two small blocks, comparing the noise characteristics between adjacent ones of said small blocks based on the noise characteristic extracted by said noise characteristic extraction unit and upon development of an anomaly between the compared noise characteristics, detecting a false alteration of the digital image data acquired by said digital image data acquisition device.

15. A digital image data false alteration detection program for causing a computer to detect a false alteration of the digital image data acquired by a digital image data acquisition device including an A/D converter, characterized in that said computer is caused to execute:
    (a) a step of extracting the characteristic about the pixel value of said digital image data; and
    (b) a step of comparing said extracted characteristic with the characteristic inherent to the pixel value of said digital image data in the A/D conversion process of said digital image data acquisition device and based on the result of comparison, detecting a false alteration of the digital image data acquired by said digital image data acquisition device.

16. The digital image data false alteration detection program according to claim 15, characterized in that said step (a) includes a step of extracting a histogram about the pixel value of said acquired digital image data, and said step (b) includes a step of comparing said extracted histogram with the histogram inherent to the pixel value of the digital image data in the A/D conversion process of said digital image data acquisition device, and in the case where said inherent histogram assumes a continuous value while said extracted histogram assumes a discontinuous value, detecting a false alteration of the digital image data acquired by said digital image data acquisition device.

17. The digital image data false alteration detection program according to claim 15, characterized in that said step (a) includes a step of dividing said acquired digital image data into at least two equal small blocks and extracting an array pattern of the pixel values for said each small block, and said step (b) includes a step of detecting a false alteration of said digital image data in the case where the array patterns of the pixel values of the small blocks extracted in said step (a) are coincident with each other, as compared with said inherent characteristic that the probability that the array patterns of the pixel values of said small blocks coincide with each other is very low.

18. The digital image data false alteration detection program according to claim 15, characterized in that said digital image data acquisition device includes an image acquisition device having a CCD, and said step (a) includes a step of extracting the pixel value of each pixel of said acquired digital image data, while said step (b) includes a step of calculating a predicted pixel value of each pixel of said digital image data by the interpolation calculation based on the CCD matrix array of said digital image data acquisition device from the pixel value of each pixel of the digital image data extracted in said step (a), and in the case where the pixel value of each pixel extracted in said step (a) fails to coincide with a corresponding predicted pixel value, detecting a false alteration of said digital image data.

19. A digital image data false alteration detection apparatus for detecting a false alteration of the digital image data acquired by a digital image data acquisition device including an A/D converter, comprising:
- an image data characteristic extraction unit for extracting the characteristic about the pixel value of said digital image data; and
- an image data false alteration detection unit for comparing the characteristic extracted by said image data characteristic extraction unit with the characteristic inherent to the pixel value of the digital image data in the A/D conversion process of said digital image data acquisition device and based on the result of comparison, detecting a false alteration of said acquired digital image data.

20. The digital image data false alteration detection apparatus according to claim 19, characterized in that said image data characteristic extraction unit extracts a histogram about the pixel value of said acquired digital image data, and in that said image data false alteration detection unit compares the histogram extracted by said image data characteristic extraction unit with the histogram inherent to the pixel value of the digital image data in the A/D conversion process of said digital image data acquisition device, and in the case where said inherent histogram assumes a continuous value while said histogram extracted by said image data characteristic extraction unit assumes a discontinuous value, detects a false alteration of the digital image data acquired by said digital image data acquisition device.

21. The digital image data false alteration detection apparatus according to claim 19, characterized in that said image data characteristic extraction unit divides said acquired digital image data into at least two equal small blocks and extracts the array pattern of the pixel values of said each small block, and in that said image data false alteration detection unit detects a false alteration of said digital image data in the case where the array patterns of the pixel values of the small blocks extracted by said image data characteristic extraction unit are coincident with each other, as compared with said inherent characteristic that the probability that the array patterns of the pixel values of said small blocks coincide with each other is very low.

22. The digital image data false alteration detection apparatus according to claim 19, characterized in that said digital image data acquisition device includes an image acquisition device having a CCD, and said image data characteristic extraction unit extracts the pixel value of each pixel of the acquired digital image data, while said image data false alteration detection unit calculates a predicted pixel value of each pixel of said digital image data by the interpolation calculation based on the CCD matrix array of said digital image data acquisition device from the pixel value of each pixel of the digital image data extracted by said image data characteristic extraction unit, and in the case where the pixel value of each pixel extracted by said image data characteristic extraction unit fails to coincide with a corresponding predicted pixel value, detects a false alteration of said digital image data.

23. A digital image data false alteration detection program for causing a computer to detect a false alteration of the digital image data acquired by a digital image data acquisition device, characterized in that said computer is caused to execute:
- a step of detecting focused areas in an image based on said digital image data, and upon determination that two or more areas are detected and spaced from each other by at least a predetermined distance, detecting a false alteration of said digital image data.

24. A digital image data false alteration detection apparatus for detecting a false alteration of the digital image data acquired by a digital image data acquisition device, comprising:
- a focused area detection unit for detecting focused areas in an image based on said digital image data; and
- an alteration detection unit for detecting a false alteration of said digital image data upon determination, based on the positions, in said image, of said areas detected by said focused area detection unit, that a plurality of the areas are detected and spaced from each other by a predetermined distance.

25. The digital data false alteration detection program according to claim 2, characterized in that said step (c) includes a step of calculating an accumulated value of said noise for said each of the small block data and calculating the correlation of said noise from the difference of the accumulated value of said noise between adjacent ones of said small block data.

26. The digital data false alteration detection program according to claim 3, characterized in that said step (c) includes a step of calculating an accumulated value of said noise for said each of the small block data and calculating the correlation of said noise from the difference of the accumulated value of said noise between adjacent ones of said small block data.

27. The digital data false alteration detection apparatus according to claim 6, characterized in that said data divider is adapted to divide said small block data into data of an arbitrary size.

28. The digital data false alteration detection apparatus according to claim 7, characterized in that said data divider is adapted to divide said small block data into data of an arbitrary size.

29. The digital data false alteration detection apparatus according to claim 6, characterized in that said false alteration detection unit calculates an accumulated value of said noise for each of said small block data and calculating the correlation of said noise from the difference of the accumulated value of said noise between adjacent ones of said small block data.

30. The digital data false alteration detection apparatus according to claim 7, characterized in that said false alteration detection unit calculates an accumulated value of said noise for each of said small block data and calculating the correlation of said noise from the difference of the accumulated value of said noise between adjacent ones of said small block data.

31. The digital data false alteration detection apparatus according to claim 8, characterized in that said false alteration detection unit calculates an accumulated value of said noise for each of said small block data and calculating the correlation of said noise from the difference of the accumulated value of said noise between adjacent ones of said small block data.

32. The digital data false alteration detection apparatus according to claim 6, characterized in that said data divider is adapted to divide said digital data at an arbitrary position.

33. The digital data false alteration detection apparatus according to claim 7, characterized in that said data divider is adapted to divide said digital data at an arbitrary position.

34. The digital data false alteration detection apparatus according to claim 8, characterized in that said data divider is adapted to divide said digital data at an arbitrary position.

35. The digital data false alteration detection apparatus according to claim 9, characterized in that said data divider is adapted to divide said digital data at an arbitrary position.

* * * * *